(12) United States Patent
Soryal et al.

(10) Patent No.: US 12,150,034 B2
(45) Date of Patent: Nov. 19, 2024

(54) RADIO FREQUENCY SIGNAL PRIORITIZATION AND SELECTION

(71) Applicant: AT&T Intellectual Property I, L.P., Atlanta, GA (US)

(72) Inventors: Joseph Soryal, Glendale, NY (US); Howard L. Lang, Wayside, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 331 days.

(21) Appl. No.: 17/807,989

(22) Filed: Jun. 21, 2022

(65) Prior Publication Data
US 2023/0413158 A1 Dec. 21, 2023

(51) Int. Cl.
*H04W 48/02* (2009.01)
(52) U.S. Cl.
CPC .................. *H04W 48/02* (2013.01)
(58) Field of Classification Search
CPC .................................................... H04W 48/02
See application file for complete search history.

(56) References Cited

U.S. PATENT DOCUMENTS

| 8,661,075 B2* | 2/2014 | Smith | H04L 65/612 |
| | | | 709/203 |
| 10,066,987 B1* | 9/2018 | Bellamy | H04W 4/029 |
| 11,153,343 B2* | 10/2021 | Luo | H04W 4/70 |

* cited by examiner

Primary Examiner — Kabir A Timory
(74) Attorney, Agent, or Firm — Guntin & Gust, PLC; Atanu Das

(57) ABSTRACT

Prioritization and selection of signals and associated cells can be managed. User equipment module (UEM) of user equipment (UE) can determine a context associated with a communication session based on analyzing usage behavior information relating to usage behavior, and profile information relating to a profile, associated with the UE. The profile information can be determined by a core module based on information relating to the network or previous communication sessions. Based on analysis results, including context, UEM can determine a characteristic, other than signal strength, that can be more heavily weighted over other characteristics associated with UE or network to facilitate determining which cell, of a cell group, the UE is to connect to for the communication session. UEM can determine and select the cell of the cell group to which the UE is to connect, based on the context and the highest weighted characteristic.

20 Claims, 9 Drawing Sheets

RADIO FREQUENCY SIGNAL PRIORITIZATION AND SELECTION

TECHNICAL FIELD

This disclosure relates generally to electronic communications, e.g., to radio frequency signal prioritization and selection.

BACKGROUND

Communication devices can communicate data to other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding electronic communications, and is not intended to be exhaustive.

DETAILED DESCRIPTION

Figure 1:
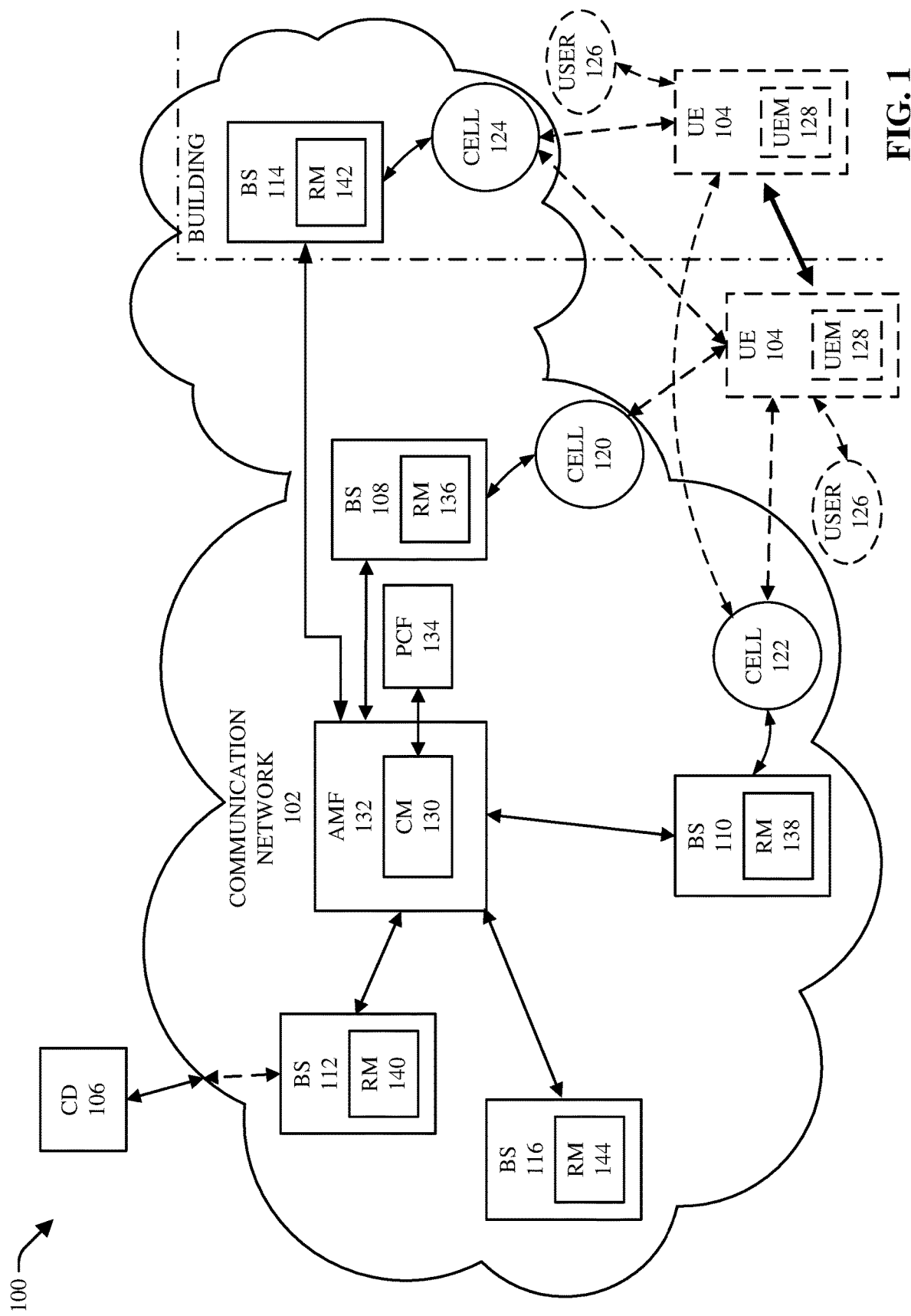
FIG. 1 illustrates a block diagram of an example system that can manage prioritization and selection of signals and associated cells of a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to managing selection of cells associated with base stations for utilization by communication devices, including prioritization and selection of signals (e.g., wireless or radio frequency (RF) signals) associated with cells. The techniques for the management of selection of cells of the disclosed subject matter can provide for enhanced (e.g., improved, more efficient, or optimal) utilization of resources associated with cells, enhanced user experience of users of communication devices, and enhanced cost efficiency (e.g., reduction of costs) to users and service providers, among other benefits, as compared to existing techniques for selection of cells for utilization by communication devices, such as more fully described herein.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), wireless fidelity (Wi-Fi), Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also can employ massive MIMO systems (e.g., hundreds of antennas at the transmitter side and receiver side). Typically, with a $(N_t, N_r)$, where $N_t$ denotes the number of transmit antennas and $N_r$ denotes the number of receive antennas, the peak data rate can multiply with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; Internet of Things (IoT) device; or other communication device) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network. Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations.

Existing radio access network (RAN) systems typically can prioritize signals (e.g., wireless signals) to and from one or more user equipment (one or more UEs) primarily based on signal strength (e.g., prioritize the signal having the highest or strongest signal strength). However, prioritizing a signal with the highest signal strength and connecting a UE to the base station that has the strongest signal strength may be undesirable in many cases. For example, there may be an undesirable cost to the user associated with connecting the UE to the base station that has the strongest signal, when another suitable signal (although not quite as strong of a signal) can be available to the UE via another base station at no cost or lower cost to the user. As another example, a user can be getting ready to use the UE for a phone call while the user is moving from a first location to a second location. While at the first location, the signal strength of a first signal associated with a first base station in proximity to the first location may be stronger than a second signal (a suitable, but not quite as strong of a signal) associated with a second base station in proximity to the second location. However, the user and associated UE are moving towards the second location and, if the UE is attached to the first base station, the UE will end up being handed over to the second base station as the UE is moved closer to the second base station, which can be an undesirable (e.g., inefficient or unsuitable) use of network resources and/or can result in an undesirable user experience during the phone call.

Also, in existing communication networks, there can be a variety of types of cells of base stations to which a UE may be able to attach, wherein such cells can be distributed across an area in which the UE is located. For instance, there can be macro cells associated with a carrier (e.g., a carrier with which the user can have a subscription for communication services), macro cells associated with a roaming communication service provider, or a micro cell associated with an entity (e.g., a small cell associated with the unlicensed citizens broadband radio service (CBRS) spectrum, a small cell associated with a carrier licensed spectrum, or a Wi-Fi cell). In some scenarios, it may be desirable to have the UE connect to a carrier macro cell, even if the signal strength of the signal associated with that carrier macro cell is not the strongest signal among the available cells while, in other scenarios, it may be desirable to have the UE connect to macro cell associated with a roaming communication service provider or connect to a micro cell, even if the signal strength of the signal associated with such cell is not the strongest signal among the available cells.

To that end, techniques for managing prioritization and selection of signals and associated cells of a communication network are presented. The communication network can comprise a group of cells (e.g., cells associated with base stations of the communication network). The group of cells can comprise one or more macro cells associated with a service provider (e.g., carrier) that can provide communication services to one or more UEs, such as a UE associated with a user, that can have a subscription with the service provider for the communication services. Additionally or alternatively, the group of cells can comprise one or more macro cells that can be associated with one or more roaming service providers (e.g., roaming partners) with respect to the UE (e.g., while the UE is roaming, the UE can have the ability to connect to one or more cells of the one or more roaming service providers, which potentially may involve a cost for such use of a cell associated with a roaming service provider). Additionally or alternatively, the group of cells can comprise one or more smaller cells, such as femto cells, micro cells, pico cells, Wi-Fi cells, and/or CBRS cells, associated with one or more entities (e.g., private entities and/or service providers) that the UE potentially can connect to for a communication session. For example, in some instances, an entity (e.g., employer) can have a smaller cell to provide wireless communication service to UEs located at or in proximity to the place of business of the entity, wherein the entity can have a subscription where the entity pays, to a service provider, a flat fee (e.g., flat fee for unlimited service or a certain amount or level of service) or a per usage fee for the communication services provided to UEs via the smaller cell. A smaller cell, such as a CBRS cell, can communicate via the unlicensed spectrum (e.g., unlicensed CBRS spectrum), or a smaller cell can communicate via the licensed spectrum (e.g., carrier licensed spectrum).

In some embodiments, one or more UEs, such as the UE of the user, can comprise a user equipment module (UEM). The UEM can have root access on the UE such that the UEM can have access to information relating to phone calls, text messages, chats, camera, electronic calendar, email, electronic gaming, communication sessions, or other applications or activity associated with the UE and associated user.

The communication network can comprise a core module (CM) that can reside in a desired part (e.g., access management function (AMF) or other network component) of the communication network. The CM can determine and generate profiles relating to UEs and associated users, including the UE and the user. The CM can determine the profile information for the profile based at least in part on the results of analyzing information relating to the communication network and/or previous communication sessions associated with the UE and/or other UEs. For instance, with regard to the UE and user, based at least in part on the results of such analysis, the CM can determine and generate a profile that can relate to one or more characteristics (e.g., attributes, properties, factors, or circumstances) of a group of characteristics that can be relevant in determining which cell of a group of cells of the communication network that the UE is to connect to for a communication session. In certain embodiments, a profile associated with the UE and/or user can comprise respective sub-profiles associated with respective contexts associated with communication sessions and the user where different sub-profiles can differently weight or prioritize different characteristics depending in part on the different contexts. The one or more characteristics can relate to, for example, respective costs associated with utilizing the respective cells, a predicted movement of a UE during a communication session, respective effects on respective signal strengths associated with respective environmental conditions relating to respective locations or respective predicted locations of the UE during the communication session, a predicted duration of the communication session, respective predicted availabilities of capacities or resources associated with the respective cells, a predicted amount of data to be communicated during the communication session, respective latencies associated with respective servers associated with respective services, a prioritization of data traffic to be communicated during the communication session, respective signal strengths associated with the respective cells and the UE, respective predicted loads associated with the respective cells, respective predicted movements of respective UEs into respective coverages areas associated with the respective cells, or another type of characteristic.

The disclosed subject matter also can comprise one or more RAN modules (RM) that can be associated with one or more base stations (e.g., gNB or other base station) of the communication network. In some embodiments, a base station can comprise an RM that can be utilized to provide service (e.g., microservice) for multiple base stations. In other embodiments, some or all of the base stations each can have their own RM. In certain embodiments, certain base stations, such as macro base stations associated with the service provider and/or roaming service provider each can have RMs, whereas smaller cells may not have their own RMs. An RM can connect to the core network (e.g., wireless or mobility core network of the communication network), including the CM, and can be architecture aware with regard to the architecture or topology of the communication network. The RM can facilitate communicating information, including profiles, between the UEMs of UEs and the CM. In some embodiments, the RM can augment, modify, or update a profile associated with a UE with additional information (e.g., additional information relating to characteristics) before communicating the profile (e.g., augmented profile) to the UEM of the UE.

The UEM of the UE can receive the profile upon connection to the communication network and/or at desired times while connected to the communication network (e.g., the UE can receive an updated profile at a desired time). The profile information of the profile can comprise network-related information regarding the communication network (e.g., signal strengths associated with cells, predicted availabilities of capacities or resources associated with the cells, predicted loads of cells, predicted movement of UEs to coverage areas of cells, or other network-related information), which can include information relating to one or more cells of one or more base stations in proximity to the UE, in addition to characteristics-related information regarding the characteristics (e.g., respective weighting or prioritization of respective characteristics).

In connection with a communication session associated with the UE, the UEM can determine a context associated with the communication session based at least in part on the results of analyzing usage behavior information relating to usage behavior, and profile information relating to the profile, associated with the UE. For example, based at least in part on such analysis results, the UEM can determine respective costs associated with utilizing respective cells, determine the cells that are in communicative proximity to the UE and their respective attributes (e.g., signal strengths, levels of congestion, locations, or other attributes), determine whether the UE is relatively stationary or is moving from one location to another location, determine the potential duration of the communication session, and/or determine other context (e.g., context or circumstances relating to the characteristics under consideration) associated with the communication session.

Based at least in part on the results of the analysis, including the context associated with the communication session, the UEM can determine a characteristic (e.g., a characteristic that can be one that is other than signal strength) that can be more heavily weighted or prioritized over other characteristics associated with UE or communication network to facilitate determining which cell, of the group of cells, the UE is to connect to for the communication session. The UEM can determine and select the cell of the cell group to which the UE is to connect for the communication session, based at least in part on the context and the highest weighted or prioritized characteristic. For example, if, based at least in part on the context and the profile, it is determined that cost is the highest weighted or prioritized characteristic over signal strength and the other characteristics of the group of characteristics, the UEM can determine which cell of the group of cells the UE can connect to for the communication session that will incur no cost or at least a lower cost to the user, as compared to the other candidate cells of the group of cells, where the candidate cells can be cells to which the UE potentially can connect for the communication session. The UEM can communicate with the selected cell to connect to the selected cell for the communication session.

These and other aspects and embodiments of the disclosed subject matter will now be described with respect to the drawings.

Referring now to the drawings, FIG. 1 illustrates a block diagram of an example system 100 that can manage prioritization and selection of signals and associated cells of a communication network, in accordance with various aspects and embodiments of the disclosed subject matter. The system 100 can comprise a communication network 102 that can comprise a mobility core network (e.g., a wireless communication network) and/or a packet data network (e.g., an Internet Protocol (IP)-based network, such as the Internet and/or intranet) that can be associated with the mobility core network.

The mobility core network (e.g., LTE, 5G, or other next generation (e.g., xG) core network) of the communication network 102 can operate to enable wireless communication between communication devices and/or between a communication device and the communication network 102. The communication network 102 can comprise various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other devices) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, UE 104, can attach or connect, or attempt to attach or connect, to the communication network 102 to communicate with other communication devices (e.g., communication device (CD) 106) associated with the communication network 102. A communication device (e.g., UE 104 or CD 106) also can be referred to as, for example, a device, a mobile device, or a mobile communication device. The term communication device can be interchangeable with (or include) a UE or other terminology. A communication device (or UE, device, or other similar term) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, or an oven, or other type of appliance having wireless communication functionality), a set-top box, an IP television (IPTV), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). In some embodiments, a communication device (e.g., UE 104 or CD 106) can be connected to the communication network 102 via a wireless communication connection. In certain embodiments, a communication device (e.g., CD 106) can be connected to the communication network 102 (e.g., a wireline and/or IP-based network portion of the communication network 102) via a wireline communication connection.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data traffic and voice traffic can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can comprise various network components or devices, which can include one or more RANs (not explicitly shown in FIG. 1), wherein each RAN can comprise or be associated with a set of base stations (e.g., access points (APs)), such as base station (BS) 108, that can serve communication devices located in respective coverage areas served by respective base stations in the mobility core network of the communication network 102. The communication network 102 can comprise or be associated with one or more base stations, such as BS 108, that can be macro cells associated with the service provider (e.g., carrier) with which the UE 104 has a subscription, one or more base stations, such as BS 110 and BS 112, that can be macro cells associated with one or more roaming service providers (e.g., roaming partners) that can provide roaming service to the UE 104, if and while the UE 104 is roaming in the communication network 102, and/or one or more smaller base stations, such as BS 114 and BS 116, that can be associated with private entities (and/or service providers) that can provide service to the UE 104, if the UE 104 is connected to such smaller base station. In some embodiments, the BSs (e.g., 108, 110, 112, 114, 116) can be communicatively connected to each other, and can exchange information, such as network-related information and UE-related information, with each other, such as described herein. For reasons of brevity and clarity, direct connections between the BSs (e.g., 108, 110, 112, 114, 116) are not explicitly shown in FIG. 1.

Each of the respective base stations (e.g., 108, 110, 112, 114, 116) can be associated with one or more sectors (not shown), wherein respective sectors can comprise respective cells, such as, for example, cell 120 associated with BS 108, cell 122 associated with BS 110, and cell 124 associated with BS 114 (other cells associated with the base stations not shown in FIG. 1 for reasons of brevity and clarity). The cells (e.g., 120, 122, 124) can have respective coverage areas that can form the coverage area covered by the one or more sectors. Respective communication devices (e.g., UE 104 and/or CD 106) can be communicatively connected to the communication network 102 via respective wireless communication connections with one or more of the respective cells (e.g., 120, 122, 124) (or can be connected to the communication network 102 via a wireline connection).

The group of cells (e.g., cells 120, 122, and/or 124, and/or other cells) can comprise one or more macro cells (e.g., cell 120, cell 122) and/or one or more smaller cells (e.g., cell 124). For instance, the group of cells can comprise one or more macro cells associated with a service provider (e.g., carrier) that can provide communication services to one or more UEs, such as a UE 104 associated with the user 126, that can have a subscription with the service provider for the communication services. Additionally or alternatively, the group of cells can comprise one or more macro cells that can be associated with one or more roaming service providers (e.g., roaming partners) with respect to the UE 104 (e.g., while the UE 104 is roaming, the UE 104 can have the ability to connect to one or more cells of the one or more roaming service providers, which potentially may involve a cost for such use of a cell associated with a roaming service provider). Additionally or alternatively, the group of cells can comprise one or more smaller cells, such as femto cells, micro cells, pico cells, Wi-Fi cells, and/or CBRS cells, associated with one or more entities (e.g., private entities and/or service providers) that the UE potentially can connect to for a communication session. As an example, an entity (e.g., an employer or a commercial business) can have a smaller cell (e.g., cell 124) to provide wireless communication service to UEs located at or in proximity to the place of business of the entity, wherein the entity can have a subscription where the entity pays, to a service provider, a flat fee (e.g., flat fee for unlimited service or a certain amount or level of service) or a per usage fee for the communication services provided to UEs via the smaller cell. A smaller cell, such as a CBRS cell, can communicate via the unlicensed spectrum (e.g., unlicensed CBRS spectrum), or a smaller cell can communicate via the licensed spectrum (e.g., carrier licensed spectrum).

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other type of network element) from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

The UE 104 can be associated with one or more users, such as user 126. The UE 104 and/or CD 106 can be associated with (e.g., can comprise, provide, and/or utilize) one or more applications and associated services. At various times, and under various scenarios, a communication device, such as the UE 104, can desire to utilize one or more applications and associated services and/or can desire to communicate with another communication device (e.g., CD 106) associated with another user. The applications and services can relate to, for example, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities. Utilization of some applications and services under some scenarios (e.g., using an application or service for video streaming, a video call, electronic gaming, certain medical-related data communications, or certain emergency, military, law enforcement, fire response, disaster response data communications) can involve a heavier level of data traffic, and/or can involve higher priority data traffic, being communicated via the communication network 102 than the relatively lighter data traffic, and/or relatively lower priority data traffic, that can be communicated when certain applications or services are utilized under other scenarios (e.g., using an application or service for communicating an ordinary text message, browsing an ordinary email, or viewing a web page).

As disclosed, existing RAN techniques, systems, and methods for selecting cells to which a UE is to connect primarily can be based on the signal strength of signals between the cells and the UE, where the UE typically can select and connect to the cell that has the strongest signal strength. However, prioritizing a signal with the strongest signal strength and connecting a UE to the base station that has the strongest signal strength may be undesirable (e.g., unwanted, unnecessary, inefficient, wasteful, or costly) in many cases, such as disclosed herein.

The system 100 can comprise and employ various techniques, methods, and components that can desirably (e.g., suitably, efficiently, reliably, enhancedly, or optimally) manage prioritization and selection of signals (e.g., wireless signals) and associated cells (e.g., 120, 122, 124) of the communication network 102, in accordance with defined communication management criteria.

In some embodiments, one or more UEs, such as the UE 104 of the user 126, can comprise a UEM 128. The UEM 128 can have root access on the UE 104 such that the UEM 128 can have access to information relating to phone calls, text messages, chats, camera, electronic calendar, email, electronic gaming, communication sessions, or other applications or activity associated with the UE 104 and associated user 126. Such information can comprise, for example, date and time of a communication (e.g., phone call, video call, text message, chat, email, or voice mail) of a communication session, a communication type of the communication (e.g., phone call, video call, text message, email, or other communication type), a duration (e.g., length) of the communication session, sender (e.g., caller or message sender) of the communication, recipient (e.g., callee or message recipient) of the communication, location of the UE(s) (e.g., UE 104) during the communication session, movement of the UE(s) during the communication session, type of application or service being utilized by the UE during the communication session, amount, type, or priority level of or associated with data being utilized or consumed during the communication session, and/or other type of information or other type of circumstances associated with the communication session.

The UEM 128 can utilize (e.g., analyze) such information, along with other information received from one or more cells (e.g., 120, 122, and/or 124) and/or other components of or associated with the communication network 102, to facilitate determining which signal and associated cell to prioritize and select for connection for a communication session over other signals and associated cells (e.g., other candidate cells). In contrast to existing RAN techniques, systems, and methods, the UEM 128 and/or other components of the system 100 can take into account and prioritize one or more characteristics, other than or in addition to signal strength, in determining which cell of the group of cells (e.g., 120, 122, and/or 124) is the most desirable cell for the UE 104 to connect to for a communication system, in accordance with the defined communication management criteria, such as more fully described herein.

In accordance with various embodiments, the communication network 102 can comprise a CM 130 that can reside in a desired part of the communication network 102. In some embodiments, the CM 130 can be part of the AMF 132 of the communication network 102. In other embodiments, the CM 130 can be a standalone component or can be part of another component of the communication network 102, and can be associated with (e.g., communicatively connected to) the AMF 132. It is to be appreciated and understood that, in still other embodiments, if a communication network 102 does not comprise an AMF 132, the CM 130 can be a standalone component and can reside in the communication network 102, can be part of another component of the communication network 102, or can reside outside of the communication network 102 where the CM 130 can be communicatively connected to the communication network 102. In certain embodiments, the AMF 132 and/or CM 130 can be associated with (e.g., communicatively connected to) a policy control function (PCF) 134 (or other same or similar function), which can be in the communication network 102, and which can comprise information relating to costs or charges, and/or subscriptions, associated with the use of communication services by UEs (e.g., UE 104) and associated users (e.g., user 126). The communication network 102 also can comprise various other components, functions, nodes, routers, or devices that can facilitate communication of data between communication devices and through the communication network 102; however, for reasons of brevity or clarity, some of these components, functions, nodes, routers, or devices are not explicitly shown.

In accordance with various embodiments, the system 100 can comprise one or more RMs that can be part of or associated with one or more BSs (e.g., 108, 110, 112, 114, and/or 116), and can perform various functions and operations in connection with, and that can facilitate, managing the prioritization and selection of signals and associated cells (e.g., 120, 122, 124) for use by UEs (e.g., 104) during communication sessions. In some embodiments, one or more of the macro BSs (e.g., 108, 110, and/or 112) can comprise an RM (e.g., 136, 138, and/or 140). In certain embodiments, additionally or alternatively, one or more of the smaller BSs (e.g., 114 and/or 116) can comprise an RM (e.g., 142 and/or 144). In still other embodiments, additionally or alternatively, one or more RANs (not explicitly shown) of the communication network 102 can comprise an RM (not explicitly shown). An RM (e.g., 136, 138, 140, 142, or 144) can be associated with (e.g., communicatively connected to), directly or indirectly, one or more UEs (e.g., UE 104), including one or more respective UEMs (e.g., UEM 128), and the CM 130.

Figure 2:
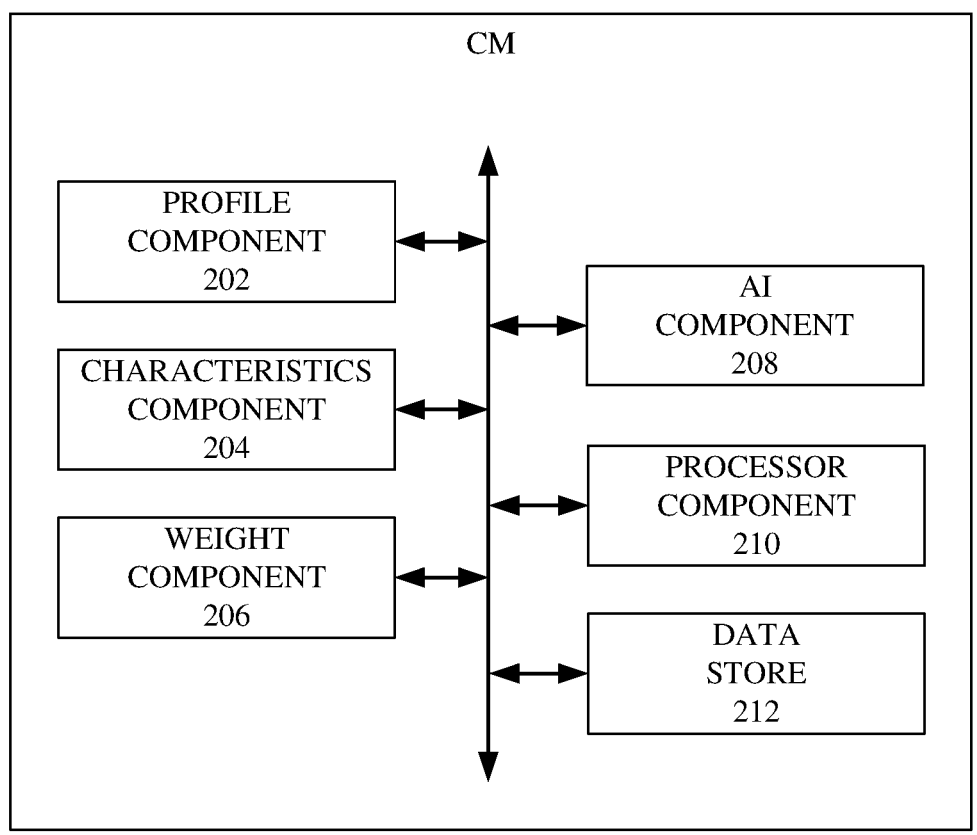
FIG. 2 depicts a block diagram of a core module associated with the communication network, in accordance with various aspects and embodiments of the disclosed subject matter.
Figure 3:
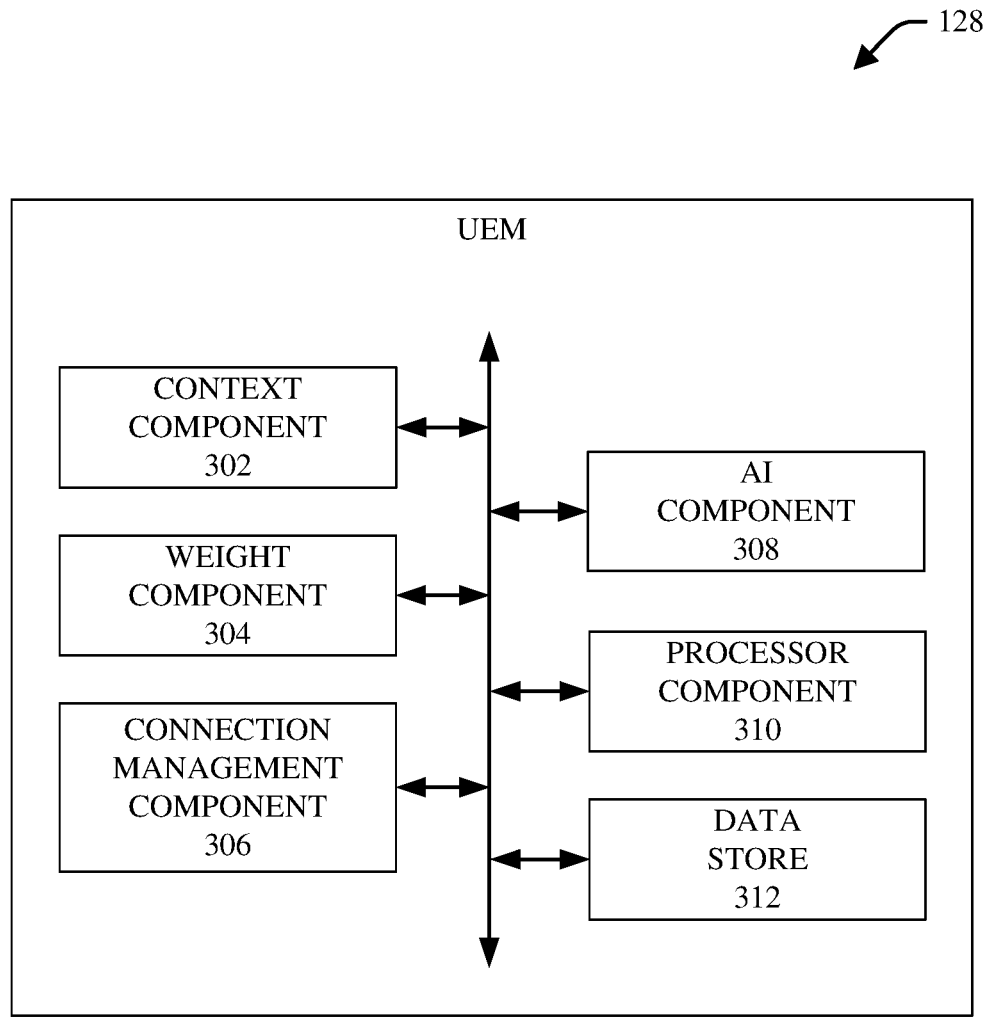
FIG. 3 depicts a block diagram of a user equipment module associated with user equipment, in accordance with various aspects and embodiments of the disclosed subject matter.
Figure 4:
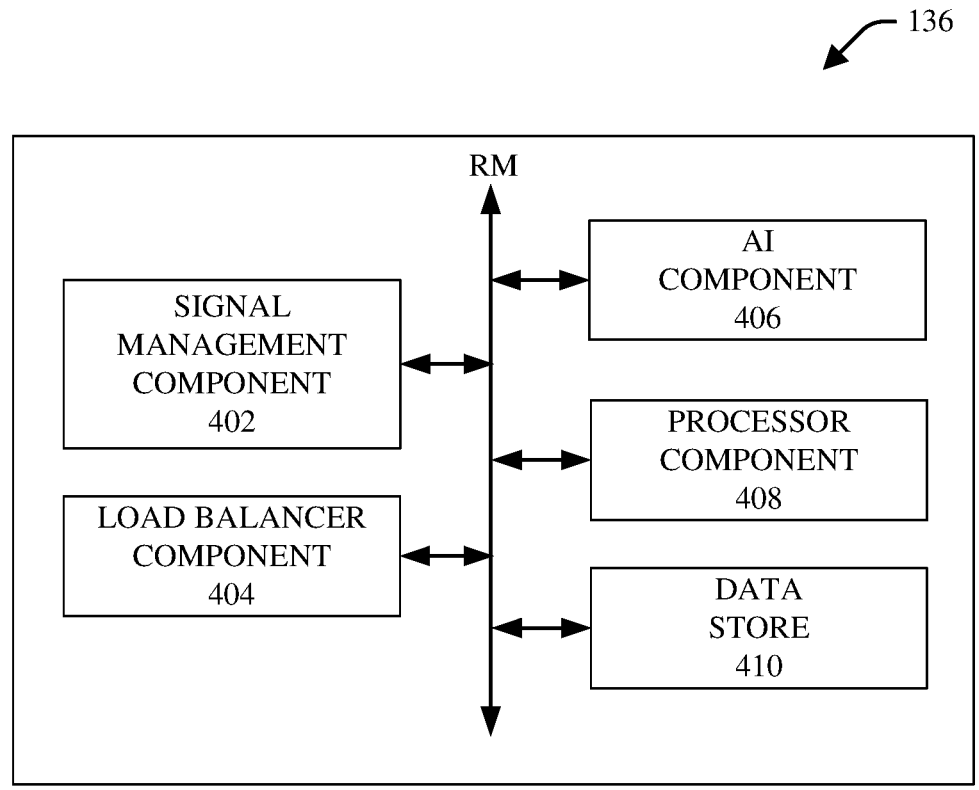
FIG. 4 depicts a block diagram of an RM associated with a base station, in accordance with various aspects and embodiments of the disclosed subject matter.

Referring to FIGS. 2, 3, and 4 (along with FIG. 1), FIG. 2 depicts a block diagram of the CM 130, FIG. 3 depicts a block diagram of the UEM 128, and FIG. 4 depicts a block diagram of the RM 136, in accordance with various aspects and embodiments of the disclosed subject matter. The CM 130 can comprise various components, including a profile component 202, a characteristics component 204, a weight component 206, an artificial intelligence (AI) component 208, a processor component 210, and a data store 212. The UEM 128 can comprise various components, including a context component 302, a weight component 304, a connection management component 306, an AI component 308, a processor component 310, and a data store 312. The RM 136 can comprise various components, including a signal management component 402, a load balancer component 404, an AI component 406, a processor component 408, and a data store 410.

The profile component 202 of the CM 130 can determine and generate respective profiles relating to respective UEs and associated users, including the UE 104 and the user 126. The profile component 202 can determine the profile information for the profile associated with the UE 104 and/or associated user 126 based at least in part on the results of analyzing information relating to the UE 104 and/or associated user 126, the communication network 102, and/or previous communication sessions associated with the UE 104 and/or other communication devices. For instance, with regard to the UE 104 and user 126, based at least in part on the results of such analysis, the profile component 202 can determine and generate the profile, associated with the UE 104 and user 126, that can relate to one or more characteristics (e.g., attributes, properties, factors, or circumstances) of a group of characteristics that can be relevant in determining which cell of a group of cells (e.g., 120, 122, 124) of the communication network 102 that the UE 104 is to connect to for a communication session. In certain embodiments, the profile associated with the UE 104 and/or user 126 can comprise respective sub-profiles associated with respective contexts associated with communication sessions and the user where different sub-profiles can differently weight or prioritize different characteristics depending in part on the different contexts (e.g., as such weights or prioritizations are determined by the weight component 206).

The characteristics component 204 can monitor and track communication network activity and UE activity that can relate to the one or more characteristics of the group of characteristics, such as described herein. The one or more characteristics can relate to, for example, respective costs associated with utilizing the respective cells (e.g., 120, 122, 124), a predicted movement of a UE (e.g., UE 104) during a communication session (e.g., potential movement of the UE within and/or between RAN coverage areas), respective effects on respective signal strengths associated with respective environmental conditions relating to respective locations or respective predicted locations of the UE (e.g., UE 104) during the communication session (e.g., in-building condition effects on communication coverage, outdoor condition effects on communication coverage, and/or other environmental condition effects on communication coverage), a predicted duration of the communication session, respective predicted availabilities of capacities or resources associated with the respective cells (e.g., 120, 122, 124), a predicted amount of data to be communicated during the communication session associated with the UE (e.g., UE 104), respective latencies associated with respective servers associated with respective services utilized during a communication session, a use class of data traffic (e.g., a priority or criticality level of data traffic) to be communicated during the communication session associated with the UE (e.g., UE 104), respective signal strengths associated with the respective cells (e.g., 120, 122, 124) and the UE (e.g., UE 104), respective predicted loads associated with the respective cells (e.g., 120, 122, 124), respective predicted movements of respective UEs into respective coverages areas associated with the respective cells (e.g., 120, 122, 124), or another type of characteristic.

In some embodiments, with regard to determining a profile associated with a UE (e.g., UE 104) and associated user (e.g., user 126), the weight component 206 can respectively weight or prioritize respective characteristics of the group of characteristics based at least in part on respective contexts that can be associated with respective communication sessions associated with the UE, user preferences associated with the UE and/or user, and/or other defined communication management criteria. For instance, based at least in part on the results of analyzing (e.g., by the profile component 202) the information relating to the UE 104 and/or associated user 126, the communication network 102, the previous communication sessions associated with the UE 104 and/or other communication devices, and/or user preferences associated with the UE or user, the weight component 206 can determine respective (e.g., different) weights (e.g., weight or prioritization values) that can be applied to the respective characteristics of the group of characteristics with respect to respective contexts that can be associated with the UE 104 and associated user 126.

For example, based at least in part on such analysis results, with regard to a first context that can be associated with the UE 104 and/or user 126, the weight component 206 can determine respective first weights (e.g., a first first-weight, a second first-weight, a third first-weight, and/or another first-weight) that can be applied to respective characteristics of the group of characteristics, wherein a first characteristic (e.g., respective costs associated with utilizing the respective cells (e.g., 120, 122, 124)) can be associated with a higher weight (e.g., a higher weight value or prioritization value) than a second characteristic (e.g., a predicted movement of the UE 104 during a communication session) of the group of characteristics. Also, based at least in part on such analysis results, with regard to a second context that can be associated with the UE 104 and/or user 126, the weight component 206 can determine respective second weights (e.g., a first second-weight, a second second-weight, a third second-weight, and/or another second-weight) that can be applied to the respective characteristics of the group of characteristics, wherein the second characteristic can be associated with a higher weight (e.g., a higher weight value or prioritization value) than the first characteristic of the group of characteristics. Thus, while, in the example, the first characteristic can be weighted or prioritized higher than the second characteristic (and/or other characteristics, which can include signal strength) for the first context, the second characteristic can be weighted or prioritized higher than the first characteristic (and/or other characteristics, which can include signal strength) for the second context. The weight component 206 can apply the respective weights to the respective characteristics for the respective contexts. Other aspects and embodiments relating to weighting or prioritizing of characteristics are described herein.

The profile component 202 can store information (e.g., profile information) relating to the respective weights applied to the respective characteristics for the respective contexts, along with other profile information, such as described herein, in the profile associated with the UE 104 and/or user 126. The profile component 202 can store the profile, comprising the profile information, in the data store 212 and also can communicate the profile to the UEM 128 of the UE 104 (e.g., via a BS and/or RM) and/or an RM(s) (e.g., RM 136 or other RM).

These example scenarios relating to different contexts can further illustrate various aspects and embodiments of the disclosed subject matter. In these illustrative examples, in connection with the example communication sessions associated with the UE 104, the UEM 128 can analyze information relating to the communication session, information relating to the UE 104 or user 126 (e.g., information relating to previous communication sessions, information in electronic calendar or otherwise related to scheduling of events, or other historical information relating to the UE 104 or user 126), and the profile information of the profile associated with the UE 104 and/or user 126. Based at least in part on the analysis results, the UEM 128 can determine the particular context for the particular example communication session.

As an example, with regard to cost, there can be a group of cells that can include a macro cell (e.g., cell 120) associated with the service entity, a macro cell (e.g., cell 122) associated with a roaming service entity, and/or a smaller cell (e.g., cell 124) associated with another entity (e.g., a private entity, such as an employer or a commercial business). In some instances, it can be desirable to weight or prioritize cost (e.g., lower cost) higher than other characteristics, including signal strength, of the group of characteristics when determining which signal and associated cell to prioritize and select for a communication session. For instance, the context, as determined by the context component 302 of the UEM 128, can be that the communication session involves a relatively low priority communication (e.g., a basic phone call, a basic communication of data, basic surfing of the Internet, or other type of lower priority data communication). In such a context, it can or may be desirable to the user 126 to keep the costs of the communication session low, even no cost, if possible. The profile can indicate that the cost factor can have a higher weight or prioritization (e.g., rank) over other characteristics, including signal strength, with regard to such context relating to a lower priority communication associated with the communication session. In the case where there are regular (e.g., macro) cells (e.g., cell 120), roaming cells (e.g., cell 122) (which also can be macro cells), and/or smaller cells (e.g., cell 124) (CBRS cell or other type of smaller cell), it can be desirable for the UEM 128 (e.g., connection management component 306 of the UEM 128) of the UE 104 to determine which cell of the group of cells (e.g., 120, 122, 124) can be utilized by the UE 104 to reduce or minimize the cost of the communication session. If the group of cells does not include a macro cell (e.g., cell 120) associated with the service entity with which the UE 104 has a subscription, and only includes a roaming macro cell(s) (e.g., cell 122) and/or a smaller cell (e.g., cell 124), or, even if there is such a macro cell associated with the service entity, but the subscription is not for an unlimited plan with regard to call minutes or data usage, there potentially can be a cost associated with the communication session.

As part of the profile, or as part of a separate request for information, the UEM 128 can query the CM 130 for information relating to costs associated with one or more of the cells of the group of cells (e.g., candidate cells). The CM 130 can access cost information (e.g., cost or charging policy information) from the PCF 134, and can send the cost information to the UEM 128 either as part of the profile or as a separate response to the query. The UEM 128 can analyze the cost information, which can indicate respective costs associated with using the respective cells of the group of cells for the communication session, and/or also can analyze information relating to the other characteristics, which can include respective signal strengths of the respective cells of the group of cells. Based at least in part on the results of such analysis, and based at least in part on the higher (e.g., highest) weighting or prioritizing cost (e.g., lower cost) over other characteristics (e.g., as identified, determined, implemented, or enforced by the weight component 304 of the UEM 128), including signal strength, of the group of characteristics, the UEM 128 (e.g., employing the connection management component 306) can determine which cell of the group of cells (e.g., cells 120, 122, and/or 124, and/or another cell(s)) has the lowest cost with respect to the communication session. For instance, if the group of cells comprises a smaller cell (e.g., cell 124) that can be utilized at no cost, and one or more roaming macro cells (e.g., cell 122) that will have a cost associated with the use of the roaming macro cell, the connection management component 306 can determine that the smaller cell (e.g., cell 124) is to be selected for the communication session over the other cells (e.g., cell 122) of the group of cells, even if the signal strength of the signal associated with the smaller cell is lower than the signal strength of the signal associated with the one or more roaming macro cells, because the cost of using the smaller cell is lower than the cost of using the roaming macro cell. Accordingly, the connection management component 306 can connect or initiate connection of the UE 104 to the smaller cell (e.g., cell 124).

As another example, there can be instances (e.g., contexts) where it can be desirable to give a higher weight or prioritization to potential UE mobility during the communication session over other characteristics, including signal strength, of the group of characteristics when determining which signal and associated cell to prioritize and select for a communication session. In connection with the communication session, the UEM 128 can analyze information relating to the communication session and previous history relating to communication sessions or other relevant information (e.g., UE location or movement information) associated with the UE 104 and/or user 126, and based at least in part on the results of analyzing such information, the context component 302 can determine the context associated with the communication session.

For instance, if the user 126 often calls the user's spouse around 12:00 p.m. during the work week as the user 126 is leaving the office building to go to lunch at one of various restaurants located a number of street blocks away from, and west of, the office building, the analysis (e.g., AI-based analysis), by the UEM 128, of the call history associated with the UE 104 can indicate that the call to the spouse for this communication session occurs often, and the analysis (e.g., AI-based analysis), by the UEM 128, of the UE location or movement information can further indicate that such a call often coincides with the UE 104 moving to a location outside of, and west of, the office building. The office building can be located closer to a first macro cell (e.g., cell 120) that can provide a first signal having a relatively higher signal strength to UEs located near the office building, while the restaurants the user 126 often goes to west of the office building can be located closer to a second macro cell (e.g., cell 122, or another cell) that can provide a second signal having a relatively weaker signal strength by the office location, although the second signal can be stronger near the restaurants west of the office building. The context component 302 can identify such context based at least in part on the results of the analysis by the UEM 128. In such a context, it can or may be desirable to give a higher (e.g., highest or at least relatively higher) weight or prioritization to UE mobility over other characteristics, including signal strength, of the group of characteristics. Accordingly, the profile (e.g., as determined by the profile component 202 and weight component 206 of the CM 130) can apply the higher weight or prioritization to potential UE mobility over the weighting or prioritization of other characteristics, including signal strength, of the group of characteristics.

The UEM 128 can analyze the profile information of the profile and the context associated with the communication session. Based at least in part on the results of such analysis, the UEM 128 (e.g., employing the weight component 304)

can determine that, given the context associated with the communication session, potential UE mobility can have a higher weight or prioritization over the weighting or prioritization of the other characteristics, including signal strength, of the group of characteristics. Also, based at least in part on the results of the analysis (e.g., AI-based analysis) relating to the context, the UEM 128 (e.g., employing the context component 302, AI component 308, and/or other component) can determine, predict (e.g., anticipate), or infer that, during the phone call, the UE 104 is going to move from the location near the office building to a location west of, and blocks away from, the office building. Based at least in part on (e.g., in response to) the UEM 128 determining, predicting, or inferring that, during the phone call, the UE 104 is going to move from the location near the office building to a location west of, and blocks away from, the office building, and based at least in part on the higher weighting or prioritizing potential UE mobility over other characteristics, including signal strength, of the group of characteristics, the connection management component 306 can determine that the second signal associated with the second macro cell (e.g., cell 122, or another cell) located closer to the restaurants west of the office building is to be prioritized and selected over the first signal associated with the first macro cell (e.g., cell 120) located closer to the office building, even though, at the beginning of the communication session, the second signal associated with the second macro cell is relatively weaker than the first signal associated with the first macro cell. This can be desirable, since the second signal will be stronger than the first signal after the UE 104 moves west towards the second macro cell, and since doing so can prevent, or at least potentially prevent, a situation where the UE 104 connects to the first macro cell and ends up having to be handed over to the second macro cell when the UE 104 moves closer to the second macro cell. Accordingly, the connection management component 306 can connect or initiate connection of the UE 104 to the second macro cell (e.g., cell 122).

As still another example, there can be instances where RAN coverage may be relatively good outdoors (e.g., outside of a building), but may be relatively poor in certain in-building locations due to various factors, such as building materials and/or usage of the UE in the basement of the building. The system 100, employing the UEM 128, CM 130, and RM (e.g., RM 136), can take into account whether the UE 104 is outdoors or inside of a building, and, if the particular in-building location has a degraded (e.g., poorer) signal from the BS, and/or can take into account other environmental conditions, when determining which signal and associated cell of a group of cells to prioritize and select in connection with a communication session. In some embodiments, with regard to such a context relating to effects on signal strength due to environmental conditions, the profile (e.g., as determined by the profile component 202 and weight component 206 of the CM 130) can apply a higher weight or prioritization to the effects on signal strengths associated with environmental conditions over the weighting or prioritization of other characteristics, including signal strength (e.g., current signal strength), of the group of characteristics when determining which signal and associated cell to prioritize and select for a communication session.

As another example, there can be differences in RAN signals and RAN coverage due to environmental conditions associated with a coverage area. For instance, an open outdoor area in proximity to a cell often can have relatively good RAN coverage, whereas RAN coverage sometimes can be relatively poor in certain in-building locations due to factors, such as building materials and/or the location (e.g., basement of the building). The system 100, including the CM 130, RM(s), and UEM 128, can take into account the environmental conditions associated with the coverage area associated with a group of cells (e.g., 120, 122, 124), and whether a particular location of the coverage area has a degraded RAN signal from a cell. For instance, the system 100 (e.g., CM 130, RM(s), UEM 128, and/or other system components) can take into account whether a UE (e.g., UE 104) is located outdoors or in-building, and whether a particular in-building location has a degraded RAN signal from a cell.

In some embodiments, the CM 130, RM(s) (e.g., RM(s) 136, 138, 140, 142, and/or 144), and/or UEMs (e.g., UEM 128) can collect information relating to RAN signals and environmental conditions associated with the cells (e.g., 120, 122, 124) of the group of cells (e.g., locations of buildings in relation to cells, locations and environmental conditions associated with UEs when the UEs had good RAN coverage, locations and environmental conditions associated with UEs when the UEs had poor RAN coverage or degraded RAN signals, and/or other desired information). The CM 130 and/or RM(s) (e.g., RM(s) 136, 138, 140, 142, and/or 144) can analyze the collected information. Based at least in part on the results of analyzing the collected information, the CM 130 and/or RM(s) can determine or identify locations (e.g., various outdoor locations) in the coverage area of the group of cells (e.g., 120, 122, 124) where the RAN signals can provide relatively good RAN coverage to UEs, without undesired interference from certain environmental conditions, and can determine or identify other locations (e.g., certain in-building locations, or certain outdoor locations) in the coverage area of the group of cells where the RAN signals can be degraded due to environmental conditions (e.g., building materials of buildings, or outdoor landscape that can negatively impact RAN signals).

While inside a building where cell 124 (e.g., CBRS cell) is located, the UE 104 may receive a relatively strong signal from the cell 124 and, due in part to the UE 104 being inside the building, the UE 104 may receive a relatively weaker signal from cell 120 (e.g., macro cell) located outside of the building. If the user 126 initiates a communication session while inside the building, depending on the context, it may be desirable to have the UE 104 connect to the cell 124 with the stronger signal, or it may be desirable to have the UE 104 connect to the cell 120 with the weaker signal, even though the signal is weaker than the signal associated with the cell 124. For instance, if the context (e.g., as determined by the context component 302 based at least in part on analysis of previous communication sessions and usage behavior associated with the UE 104 and/or user 126) indicates that the communication session involves a phone call to the user's child that usually lasts approximately 10 minutes, and the user 126 usually stays in his office in the building for the phone call with his child, the connection management component 306 can determine that the UE 104 is to connect to the cell 124. However, if, instead, the context indicates that the communication session involves a phone call to the user's spouse that usually lasts approximately 20 minutes, and the user 126 usually leaves his office within a few minutes and walks outside the building while talking to his spouse, the connection management component 306 can determine that the UE 104 is to connect to the cell 120, even though, at least initially, the signal strength of the signal from the cell 120 is relatively weaker than the signal strength of the signal from the cell 124.

As yet another example, there can be instances where, for a communication session, it can be desirable to give a higher weight or prioritization to potential communication session duration (e.g., duration of a phone call or other type of communication) over other characteristics, including signal strength, of the group of characteristics when determining which signal and associated cell to prioritize and select for a communication session. In connection with the communication session, the UEM 128 can analyze information relating to the communication session and previous history relating to communication sessions or other relevant information (e.g., information obtained from electronic calendar, email, text message, or voice mail) associated with the UE 104 and/or user 126, and based at least in part on the results of analyzing such information, the UEM 128 can determine the context associated with the communication session.

For instance, if the user 126 often calls the user's spouse at approximately 11:45 a.m. during the work week as the user 126 is leaving the office building to go sit in a courtyard adjacent to the office building (e.g., for a lunch break), the analysis (e.g., AI-based analysis), by the UEM 128 (e.g., by the AI component 308 of the UEM 128), of the communication session history associated with the UE 104 can indicate that the phone call to the spouse for this communication session often occurs at approximately 11:45 a.m. during the work week, and the phone call often has a duration of approximately 30 minutes. The office building can have a smaller cell (e.g., cell 124) located near the courtyard that can provide a first signal having a relatively higher signal strength to UEs located in the courtyard. There also can be a macro cell (e.g., cell 120, or cell 122) that can provide a second signal having a relatively weaker signal strength by the courtyard. Between 12:00 p.m. and 1:00 p.m., the smaller cell (e.g., cell 124) typically can become relatively congested, and can have a significant portion of its network resources in use, as many people in the office building often go to the cafeteria near the smaller cell or out to the courtyard near the smaller cell during the lunch hour and use their communication devices. The macro cell (e.g., cell 120, or cell 122), which can have a significant amount of resources at its disposal, typically can have network resources available during the lunch hour. The context component 302 can identify such context based at least in part on the results of the analysis of information by the UEM 128, wherein such information can comprise information relating to the smaller cell and the larger cell and their respective network resources, which can be part of or embedded in the profile information of the profile associated with the UE 104. In such a context, it can or may be desirable to give a higher (e.g., highest or at least relatively higher) weight or prioritization to potential communication session duration over other characteristics, including signal strength, of the group of characteristics. Accordingly, the profile (e.g., as determined by the profile component 202 and weight component 206 of the CM 130) can apply the higher weight or prioritization to potential communication session duration over the weighting or prioritization of other characteristics, including signal strength, of the group of characteristics.

The UEM 128 can analyze the profile information of the profile and the context associated with the communication session. Based at least in part on the results of such analysis, the UEM 128 (e.g., employing weight component 304) can determine that, given the context associated with the communication session, potential communication session duration can have a higher weight or prioritization over the weighting or prioritization of the other characteristics, including signal strength, of the group of characteristics. Also, based at least in part on the results of the analysis (e.g., AI-based analysis by the AI component 308 or other analysis) relating to the context, the UEM 128 can determine, predict (e.g., anticipate), or infer that the communication session is going to last approximately 30 minutes.

Based at least in part on (e.g., in response to) the UEM 128 determining, predicting, or inferring that the phone call is going to be approximately 30 minutes in length, the smaller cell is going to experience congestion and a higher level of network resource usage during a portion (e.g., the last 15 minutes) of the phone call, and the macro cell will have relatively low congestion and significant network resources available during the entire phone call, and based at least in part on the higher weighting or prioritizing potential communication session duration over other characteristics, including signal strength, of the group of characteristics, the connection management component 306 can determine that the second signal associated with the macro cell (e.g., cell 120, or cell 122) is to be prioritized and selected over the first signal associated with the smaller cell (e.g., cell 124) located closer to the cafeteria and courtyard, even though, at the beginning of the communication session, the second signal associated with the macro cell is relatively weaker than the first signal associated with the smaller cell. This can be desirable, since the smaller cell is expected to experience relatively high congestion and network resource usage during the last 15 minutes of the phone call, and since doing so can prevent, or at least potentially prevent, a situation where the UE 104 initially connects to the smaller cell, but ends up being handed over to the macro cell during the latter portion of the phone call when the smaller cell becomes congested with a significant number communication devices connecting to it. Accordingly, the connection management component 306 can connect or initiate connection of the UE 104 to the macro cell (e.g., cell 120, or cell 122).

Under a different scenario, where the phone call associated with the UE 104 often only lasts 10 minutes (rather than 30 minutes), based at least in part on the analysis results for that different scenario, the connection management component 306 can, instead, determine that that the first signal associated with the smaller cell (e.g., cell 124) is to be prioritized and selected over the second signal associated with the macro cell (e.g., cell 120, or cell 122) because the phone call is expected to be completed before 12:00 p.m. when the smaller cell is expected to experience relatively high congestion with a significant number communication devices connecting to it.

As still another example, there can be instances where, for a communication session, it can be desirable to give a higher weight or prioritization to anticipated available capacity of a cell over other characteristics, including signal strength, of the group of characteristics when determining which signal and associated cell to prioritize and select for a communication session. With regard to such instances, if desired, the profile component 202 and weight component 206, when determining and generating the profile associated with the UE 104, can apply such higher weight or prioritization to anticipated available capacity of a cell over the other characteristics. Accordingly, in the example scenario above regarding the phone call at 11:45 a.m. that is predicted to last 30 minutes, the UEM 128 (e.g., employing the connection management component 306) can determine that the second signal associated with the macro cell (e.g., cell 120, or cell 122) is to be prioritized and selected over the first signal associated with the smaller cell (e.g., cell 124) located closer to the cafeteria and courtyard, even though, at the beginning of the communication session, the second signal associated with the macro cell is relatively weaker than the first signal associated with the smaller cell. Again, this can be desirable, since the smaller cell is expected to experience relatively high congestion and network resource usage, and, accordingly, a lower level of capacity, during the last 15 minutes of the phone call, whereas the macro cell is expected to have relatively lower congestion and sufficient network capacity and resources available, and since doing so can prevent, or at least potentially prevent, a situation where the UE 104 initially connects to the smaller cell, but ends up being handed over to the macro cell during the latter portion of the phone call when the smaller cell becomes congested with a significant number communication devices connecting to it. Accordingly, the connection management component 306 can connect or initiate connection of the UE 104 to the macro cell (e.g., cell 120, or cell 122).

Alternatively or additionally, with regard to giving a higher prioritization of potential call duration and/or anticipated available capacity of a cell over the other characteristics, in certain embodiments, the CM 130 or an RM (e.g., RM 136) employing the signal management component 402, or RM 142) can control signal operations of the BSs (e.g., BS 108, BS 114, or another BS) to have one or more of the BSs (e.g., O-RAN BSs or other type of BSs) adjust their signal strength values to steer one or more communication devices (e.g., UE 104 and/or other communication devices) towards a desired cell (e.g., cell 120) that can have, or can be expected to have, sufficient network capacity and resources available for communication sessions of such communication devices during a particular period of time, and away from a cell (e.g., cell 124) that can be expected to have relatively higher congestion and insufficient network capacity and resource available for those communication sessions during that particular time period, in accordance with the defined communication management criteria.

For instance, with regard to the above example of a 30-minute phone call by the UE 104 at 11:45 a.m., the RM 136 (e.g., employing the signal management component 402) associated with the cell 120 can adjust the signal strength value of the second signal of the macro cell 120 to make the second signal appear stronger to the UE 104 (e.g., UEM 128 of the UE 104) than the second signal actually is, and stronger than the first signal associated with the smaller cell 124. As a result, the connection management component 306 of the UEM 128 can prioritize and select the second signal and associated cell 120 over the first signal and associated cell 124 for that phone call, even though the first signal is actually stronger than the second signal. Alternatively, the RM 142 (e.g., employing its signal management component) can adjust the signal strength value of the first signal of the smaller cell 124 to make the first signal appear weaker to the UE 104 than it actually is, and weaker than the second signal associated with the macro cell 120, and, as a result, the connection management component 306 of the UEM 128 can prioritize and select the second signal and associated cell 120 over the first signal and associated cell 124 for that phone call, even though the first signal is actually stronger than the second signal. In these ways, the base stations (e.g., BSs 108, 110, 112, 114, and/or 116) can offload or steer traffic (e.g., traffic of communication devices) away from a cell that can be expected to be busier (e.g., congested) during a particular time period to another nearby cell(s) that can be expected to have capacity and resources available to serve those communication devices.

With further regard to predicting the length of time of a communication session, in some embodiments, the UEM 128 (e.g., employing the context component 302 and/or AI component 308) can determine or predict the duration of a communication session based at least in part on the results of analyzing information in or associated with the electronic calendar, email, text message, voice mail, or other available data sources associated with the UE 104. For example, the UEM 128 can analyze the electronic calendar, email message, text message, or voice mail message associated with the UE 104, and, based at least in part on the analysis results, can identify that there is a scheduled phone call (or scheduled video conference) that is scheduled to occur at a particular date and time, and is scheduled to have a particular duration (e.g., one hour). Based at least in part on the knowledge of that scheduled phone call (or scheduled video conference), the UEM 128 can predict or determine that the UE 104 is going to be used on that particular date and time for that particular duration. Based at least in part on that context (and/or other context associated with that particular date and time), and the prioritization of a particular characteristic(s) (e.g., potential call duration, anticipated available capacity of a cell, or other prioritized characteristic) over the other characteristics of the group of characteristics, the connection management component 306 of the UEM 128 can prioritize and select a desired (e.g., suitable, appropriate, or optimal) signal and associated cell for the scheduled communication session over another signal(s) and associated cell(s), in accordance with the defined communication management criteria. For instance, the connection management component 306 can prioritize and select a signal and associated cell that is predicted or determined to have available capacity for the entire one-hour communication session at that particular date and time over another signal and associated cell that can be predicted to be too congested at that time to have the available capacity to be available for the entire one-hour communication session, and, as a result, may end up having to be handed over to another cell during the communication session.

As yet another example of prioritizing a characteristic, there can be instances where, for a communication session, it can be desirable to give a higher weight or prioritization to anticipated data consumption over other characteristics, including signal strength, of the group of characteristics when determining which signal and associated cell to prioritize and select for a communication session. Different applications and services can involve different amounts of data usage. For instance, the user 126 using the UE 104 to view email usually can consume less data than when the user 126 uses the UE 104 for a video call or to play an online video game. With regard to a video call, it may be desirable to prioritize a signal associated with a cell that has sufficient bandwidth available to desirably (e.g., suitably or optimally) handle the video call over another signal associated with another cell that may not have sufficient bandwidth available to desirably handle the video call, whereas, with regard to a communication session involving the user checking email, a signal associated with a cell having relatively lower bandwidth available still can be acceptable. If desired, the profile (e.g., as determined by the profile component 202 and weight component 206 of the CM 130) associated with the UE 104 can apply the higher weight or prioritization to anticipated data consumption over the weighting or prioritization of other characteristics, including signal strength, of the group of characteristics, for example, when the anticipated data consumption associated with a communication session associated with the UE 104 is relatively high.

In connection with a video call (or other higher bandwidth communication session) associated with the UE 104, the context component 302 of the UEM 128 can analyze information relating to the communication session, wherein such information can include the type of application (e.g., video call application) being used for the communication session, the type of data (e.g., video and audio content) to be communicated during the communication session, or other desired (e.g., relevant) information (e.g., information of or associated with the electronic calendar, emails, text messages, voice mails, or other information) associated with the UE 104 and/or user 126. Based at least in part on the results of such analysis (e.g., AI-based analysis by the AI component 308), the context component 302 can determine the context associated with the communication session, with the context being that the communication session can be predicted to be a video call that will involve a relatively high consumption of data (e.g., involve a significant amount of data being communicated).

The UEM 128 can analyze the profile information of the profile associated with the UE 104 and the context associated with the communication session. Based at least in part on the results of such analysis, the UEM 128 (e.g., employing the weight component 304 and/or connection management component 306) can determine that, given the context associated with the communication session, anticipated data consumption can have a higher weight or prioritization over the weighting or prioritization of the other characteristics, including signal strength, of the group of characteristics. Also, based at least in part on the results of the analysis (e.g., AI-based analysis) relating to the context, the UEM 128 can determine, predict (e.g., anticipate), or infer that the communication session is going to involve a significant amount of data being communicated for which a relatively higher bandwidth can be desired (e.g., wanted or needed). The connection management component 306 also can analyze information relating to the group of cells in proximity to the UE 104, wherein such information can indicate, for example, respective resources and bandwidth available from the respective cells of the cell group to support the communication session, respective signal strengths of signals associated with the respective cells, and/or other desired (e.g., relevant) information. In this example instance, the information relating to the group of cells can indicate that the macro cell 120 and macro cell 122 both happen to be relatively congested with a large number of communication devices connected to each, and thus, they have relatively lower bandwidth available, although their respective signal strengths are relatively stronger than the signal strength associated with the smaller cell 124, which is determined to have a relatively high amount of resources and bandwidth available. Based at least in part on such analysis results, the connection management component 306 can determine that a first signal associated with the smaller cell 124 is associated with a relatively higher amount of resources and bandwidth available and a relatively lower (but sufficient) signal strength, and the second signal and third signal respectively associated with the macro cell 120 and macro cell 122 are associated with relatively lower resource and bandwidth availability, but they do have relatively higher signal strength. Based at least in part on such determinations, the context, and the profile prioritizing anticipated data consumption over the other characteristics, the connection management component 306 can determine that the first signal and associated smaller cell 124 are to be prioritized and selected over the second signal and associated macro cell 120 and the third signal and associated macro cell 122 due in part to the first signal and associated smaller cell 124 being determined to have a relatively higher amount of resources and bandwidth available to support the video call, even though the signal strength of the first signal is lower than the second signal and third signal. Accordingly, the connection management component 306 can connect or initiate connection of the UE 104 to the smaller cell 124 for the communication session.

Under some circumstances, it can be desirable to have relatively low latency of communication of data traffic during a communication session. For example, if college students are taking a college exam (e.g., final exam or other major or important exam) online, it can be desirable to have data traffic associated with the college exam communicated with relatively low latency and with high reliability, so that the taking of the college exam by the college students is not undesirably disrupted or negatively impacted due to latency or unreliability associated with communication of data traffic during the communication session. As another example, if users are competing in a major gaming tournament (e.g., chess tournament, electronic sports games tournaments, or other electronic or online gaming tournament) online, it can be desirable to have data traffic associated with the college exam communicated with relatively low latency and with high reliability (e.g., by providing a communication connection that has a desirably high bandwidth and quality of service (QoS)), so that online participation in the game us not undesirably disrupted or negatively impacted due to latency or unreliability associated with communication of data traffic during the communication session.

The CM 130 and/or RM(s) (e.g., RM(s) 136, 138, 140, 142, and/or 144) can be web server-conscious or aware of latencies or potential latencies associated with online (e.g., web or application) servers based at least in part on analysis of historical information relating to such servers and/or active probing regarding latencies associated with those servers by the CM 130 and/or RM(s). For instance, the CM 130 and/or RM(s) can know which backend server (e.g., web or application server) has or is associated with a higher latency or delay, or associated with a lower latency or delay based at least in part on the analysis of the historical information relating to such servers and/or the active probing. Based at least in part on such knowledge regarding which backend server has or is associated with higher or lower latency or delay, an RM (e.g., RM 136 (e.g., employing the signal management component 402), and/or RM(s) 138, 140, 142, and/or 144) can adjust a signal strength value of a signal (e.g., RAN signal) associated with a BS (e.g., BS 108, 110, 112, 114, or 116) to make the signal appear stronger or weaker, as desired, to steer communication devices (e.g., UE 104) toward or away from connecting to the BS (e.g., toward or away from connecting to a cell associated with a BS). If and when desired (e.g., based on the context), the latency characteristic can be more highly weighted or prioritized (e.g., by the weight component 206 of the CM 130) to facilitate determinations regarding which signal and associated cell is to be prioritized and selected over other signals and associated cells of a group of cells in connection with a communication session, in accordance with the defined communication management criteria.

As an example of adjusting the signal strength value of a signal associated with a cell, with regard to the example college exam scenario above, the CD 106 can be a server (e.g., online, web, or application server) that is to be used to facilitate administering the college exam to students, which can include user 126, who can connect to the server using their communication devices, which can include UE 104.

The CD 106 can communicate a request to the CM 130 to inform the CM 130 that an online college exam is being administered to students (e.g., user 126) online via their respective communication devices (e.g., UE 104) at a scheduled date and time, and the college exam will be for a particular length of time (e.g., two hours), and to request that the communication network 102 provide sufficient (e.g., suitable, acceptable, or optimal) wireless communication coverage, bandwidth, QoS, communication rate, and/or communication connection reliability to the communication devices of the students at the schedule date and time, and for the duration of the college exam.

In response to the request (and the granting of such request), the CM 130 can instruct RMs (e.g., 136, 138, 140, 142, and/or 144) of or associated with a group of cells (e.g., 120, 122, and/or 124) to respectively adjust their signal strength values associated with signals that are communicated to the communication devices (e.g., UE 104) associated with the students (e.g., user 126), and other communication devices associated with other users, to facilitate steering communication devices towards connecting to or away from connecting to respective cells of the group of cells such that the communication devices (e.g., UE 104) associated with the students (e.g., user 126) can be connected to respective cells of the group of cells that can provide those communication devices sufficient wireless communication coverage, bandwidth, QoS, communication rate, and/or communication connection reliability at the schedule date and time, and for the duration of the college exam.

For instance, at or near the date and time of the scheduled college exam, the RM 136 (e.g., employing the signal management component 402) associated with cell 120 can adjust (e.g., increase) a first signal strength value of a first signal that is communicated to UE 104 to make the first signal appear to be a stronger signal than it actually is and/or another RM (e.g., RM 142, employing its signal management component) associated with another cell (e.g., cell 124) can adjust (e.g., decrease) a second signal strength value of a second signal that is communicated to the UE 104 to make the second signal appear weaker than it actually is and weaker than the first signal to facilitate steering the UE 104 towards prioritizing and selecting the first signal, and connecting to the cell 120 (which can provide the desired communication connection, bandwidth, and resources to the UE 104), and away from selecting the second signal and connecting to the other cell. In some embodiments, at or near the date and time of the scheduled college exam, the RM 142 (e.g., employing its signal management component) associated with cell 124 can adjust (e.g., increase) a third signal strength value of a third signal that is communicated to another communication device to make the third signal appear to be a stronger signal than it actually is and/or the RM 136 (e.g., employing the signal management component 402) associated with the cell 120 can adjust (e.g., decrease) a fourth signal strength value of a fourth signal that is communicated to the other communication device to make the fourth signal appear weaker than it actually is and weaker than the third signal to facilitate steering the other communication device towards prioritizing and selecting the third signal, and connecting to the cell 124, and away from selecting the fourth signal and connecting to the cell 120, to facilitate saving bandwidth and resources for the UE 104 while the UE 104 is connected to the cell 120 and the user 126 is taking the college exam.

It is noted that, since some communication devices may not have UEMs that can facilitate desirably prioritizing and selecting a signal and associated cell, the RMs (e.g., RMs, 136, 138, 140, 142, and/or 144), by adjusting signal strength values associated with signals communicated to communication devices, can desirably control and/or steer communication devices, whether they have UEMs or not, towards or away from connecting to certain cells (e.g., cells 120, 122, or 124), as desired (e.g., as wanted or needed), in accordance with the defined communication management criteria.

As still another example of prioritizing a characteristic, there can be instances where, for a communication session, it can be desirable to give a higher weight or prioritization to use class of data traffic over other characteristics, including cost and signal strength, of the group of characteristics when determining which signal and associated cell to prioritize and select for a communication session. With regard to such instances, if desired, the profile component 202 and weight component 206, when determining and generating the profile associated with the UE 104, can apply such higher weight or prioritization to use class (e.g., priority or criticality level) of data traffic over the other characteristics. For instance, communication devices associated with certain users (e.g., first responders, law enforcement personnel, fire department personnel, medical personnel, hazmat personnel, military personnel, or certain other government or private personnel) and/or certain government or private services, systems, or agencies (e.g., first responder services, law enforcement agency, fire department, medical care services, hazmat services, military organizations, or certain other government or private entities) can be utilized to communicate data traffic relating to various types of significant or emergency events (e.g., fires, explosions, hazardous material spills, criminal activity, accidents, events causing injury or harm to persons or property, military operations, or other type of significant or emergency event). When high priority or critical data traffic is being communicated in connection with a significant or emergency event, it typically can be desirable to be able to have that data traffic communicated reliably (e.g., via a communication connection that can provide sufficient resources, bandwidth, and/or QoS), even if there is a cost associated with having that data traffic communicated reliably.

The profile (e.g., as determined by the CM 130) associated with the UE 104 can weight or prioritize use class of data traffic over other characteristics, including cost and signal strength, of the group of characteristics. In this example, if the UE 104 is associated with a user 126 who is going to be engaging in higher priority communications of information in connection with a significant or emergency event, the context component 302 of the UEM 128 can determine the context of the UE 104 and associated user 126 based at least in part on the result of analyzing information relating to the communication session being initiated and/or previous communication session history. For instance, with regard to high priority data communications, the UE 104 may be utilizing a particular application or service used for emergency or significant events, may be communicating with another communication device(s) utilized for emergency or significant events, may be located in proximity to an emergency or significant event, may receive an indicator or user preference from the user 126 indicating that the data traffic is high priority, or may be engaging in activity indicative of being associated with an emergency or significant event. Based at least in part on the context and the profile weighting or prioritizing use class of data traffic over the other characteristics, the connection management component 306 of the UEM 128 can give higher weight or priority to a signal and associated cell of the group of cells (e.g., 120, 122, and 124) that can provide sufficient resources, bandwidth, QoS, and/or reliability to support communication of high priority data traffic associated with the UE 104 during the communication session.

In this example, the cell 120 can provide a first signal having a first signal strength, where the cell 120 can be relatively congested or otherwise does not have sufficient resources or bandwidth to provide reliable communication of data traffic associated with the UE 104, but there is no cost associated with using the cell 120 under the subscription associated with the UE 104. The cell 122 can provide a second signal having a second signal strength that can be lower than the first signal strength, where the cell 122 does have sufficient resources, bandwidth, and signal strength to provide desirably good and reliable communication of data traffic associated with the UE 104, however, there is a cost associated with using the cell 122 under the subscription associated with the UE 104. The cell 124 can provide a third signal having a third signal strength that can be higher than the second signal strength, where the cell 124 does not have sufficient resources or bandwidth to provide sufficiently good and reliable communication of data traffic associated with the UE 104 (or at least not as good and reliable communication of data traffic as the second signal and cell 122 can provide), although there is no cost associated with using the cell 124 under the subscription associated with the UE 104.

The UEM 128 can analyze information relating to the group of cells (e.g., 120, 122, and 124), including the respective resources, bandwidths, signal strengths, and costs associated with the respective cells. Based at least in part on the results of such analysis, the context, and the profile weighting or prioritizing use class of data traffic over the other characteristics, including cost (e.g., lower cost) and signal strength, the connection management component 306 of the UEM 128 can prioritize and select the second signal and associated cell 122 over the first signal and associated cell 120 and the third signal and associated cell 124 due in part to the cell 122 being able to provide sufficient resources and bandwidth to provide desirably good and reliable communication of data traffic associated with the UE 104 during the communication session, even though there is a higher cost associated with using the cell 122 and even though the second signal strength is relatively lower than the other signal strengths. Accordingly, the connection management component 302 can connect or initiate connection of the UE 104 to the cell 122 for the communication session.

In some embodiments, in connection with the emergency or other significant event, an RM(s) (e.g., 136, 138, 140, 142, and/or 144) of or associated with the group of cells (e.g., 120, 122, and 124) can adjust (e.g., increase or decrease) signal strength values of signals (e.g., from their actual signal strength values) communicated by some or all of the cells in the region to certain communication devices determined to not be communicating high priority data traffic in order to steer those certain communication devices away from connecting to one or more of the cells (e.g., cell 122) in the region, or causing some of those certain communication devices to disconnect from the one or more cells (e.g., cell 122), to free up resources and bandwidth of the one or more cells for use by UEs (e.g., UE 104) that are communicating higher priority data traffic.

In some instances, it can be desirable to balance loads among a group of cells (e.g., 120, 122, 124). For example, there can be a group of cells (e.g., 120, 122, 124) in a region, where a relatively high number of UEs are connected to one (e.g., cell 120) of the cells, while relatively few UEs are connected to the other cells (e.g., cells 122 and 124). This can be due, for instance, to cell 120 providing a stronger signal to the high number of UEs connected to it, as compared to the signal strengths provided by the other cells 122 and 124. The CM 130 (e.g., employing the profile component 202 and/or weight component 304), an RM(s) (e.g., 136, 138, 140, 142, and/or 144), and/or a profile associated with a UE 104 can weight or prioritize load balancing among cells higher than other characteristics of the group of characteristics to facilitate achieving desired load balancing among the cells of the group of cells. If, based at least in part on an analysis of respective loads on respective cells (e.g., 120, 122, 124), the CM 130 or an RM(s) (e.g., 136, 138, 140, 142, and/or 144) detects that the loads among the cells (e.g., 120, 122, 124) are undesirably unbalanced (e.g., based on defined communication management criteria relating to load balancing and/or an associated threshold amount of load imbalance being determined to be satisfied), the CM 130 or the RM(s) (e.g., RM 136, employing the load balancer component 404) can instruct one or more UEs (e.g., UEs engaged in relatively low priority data communications, such as surfing the Internet, checking regular emails, or other low priority activity) connected to the more highly loaded cell 120 to disconnect from the cell 120 and connect to another cell (e.g., cell 122 or cell 124) that is providing a signal having a relatively lower signal strength. This can desirably reduce the load imbalance across the cells by shifting some of the load from the highly loaded cell 120 to the other cells 122 and/or 124 that have relatively lower loads.

Additionally or alternatively, the CM 130 (e.g., employing the profile component 202 and/or weight component 206) or RM(s) (e.g., employing the load balancer component 404) can modify a profile associated with a UE (e.g., UE 104) to weight or prioritize another characteristic (besides signal strength or other characteristic that caused the UE to connect to the cell 120) over the other characteristics, and can communicate the modified profile to the UE (e.g., UE 104). Based at least in part on the modified profile, the connection management component 306 can disconnect the UE 104 from the highly loaded cell 120 and can connect, or initiate connection of, the UE 104 to another cell 122 or 124 that has a relatively lower load, which can facilitate reducing the load imbalance across the cells by shifting some of the load from the highly loaded cell 120 to another cell (e.g., cell 122 or 124).

Additionally or alternatively, RM(s) (e.g., RM 136, employing the signal management component 402, and/or RM(s) 138, 140, 142, and/or 144), on its own or as instructed by the CM 130, can adjust (e.g., increase or decrease) signal strength values of signals (e.g., from their actual signal strength values) communicated by some or all of the cells (e.g., 120, 122, and/or 124) in the region (e.g., coverage area) to certain communication devices in order to steer those certain communication devices away from connecting to the highly loaded cell 120 and towards connecting to cells 122 or 124 that have relatively lower loads, or causing some of those certain communication devices to disconnect from the cell 120 and connecting to cells 122 or 124, to facilitate reducing the load imbalance across the cells by shifting some of the load from the highly loaded cell 120 to the other cells 122 and/or 124.

In some instances, there can be major events where a large number of UEs and associated users will be coming to a particular region and connecting to cells in the region (e.g., coverage area). Major events can include, for example, a major sporting event (e.g., baseball game, football game, basketball game, or other sporting event), a music concert, a major festival (e.g., a food festival, a music festival, or a holiday festival), a major holiday event (e.g., New Year's Eve at Times Square or Las Vegas, Mardi Gras, or other holiday event), or another type of major event. It can be desirable to anticipate and prepare for large numbers of UEs coming into a coverage area associated with a group of cells (e.g., 120, 122, and/or 124) at approximately the same time, such as in connection with the occurrence of a major event, so that the communication network 102 (e.g., CM 130, BSs, cells, RMs, and other network components) can desirably prepare to handle and manage the connections of many UEs to cells in the coverage area, including desirably balancing loads among the cells in the coverage area. This also can include a coverage area(s) associated with a travel route(s) (e.g., highway or other roads) to or from the location of the major event.

In connection with an upcoming major event in a particular coverage area, the CM 130 and the RMs (e.g., 136, 138, 140, 142, and/or 144) can obtain information informing them about the upcoming major event (e.g., type of event, date and time of the event, location of the event, projected number of people to attend the event) and can communicate and coordinate with each other to facilitate performing operations and taking action to desirably handle and manage the connections of the many UEs (e.g., UE 104) to cells in the coverage area where the major event is to take place and associated coverage areas along travel routes to or from the location of the major event. For instance, the CM 130, employing the profile component 202 and/or weight component 206, can modify profiles associated with UEs to modify weighting or prioritization of certain characteristics to facilitate achieving a desired balancing of connections of UEs across the cells of the group of cells (e.g., 120, 122, 124) associated with the coverage area(s) and/or to facilitate having resources and bandwidth available for higher priority data traffic associated with certain UEs that may be in the coverage area(s) during the major event. The CM 130 can communicate the modified profile to various UEs, which can include UEs (e.g., UE 104) that may be in the coverage area(s) before, during, or after the major event. The UEMs (e.g., UEM 128) of those UEs (e.g., UE 104) can utilize the modified profiles to facilitate determining which signal and associated cell (e.g., 120, 122, or 124) of the group of cells to prioritize and select over other signals and associated cells when in the coverage area(s) in connection with the major event.

Additionally or alternatively, one or more of the RMs (e.g., RM 136, employing the signal management component 402, and/or RM(s) 138, 140, 142, and/or 144) associated with the cells of the group of cells can adjust (e.g., increase or decrease) signal strength values of signals (e.g., from their actual signal strength values) communicated by some or all of the cells (e.g., 120, 122, and/or 124) in the coverage area(s) to certain UEs in order to steer those certain UEs away from a certain cell (e.g., cell 120) or towards another cell(s) (e.g., cell 122 or cell 124), such as described herein, to facilitate achieving a desired balance of loads across the cells (e.g., 120, 122, and/or 124) in the coverage area(s) before, during, or after the major event.

In some embodiments, the UEM 128 (or CM 130 or an RM (e.g., RM 136)) can consider and take into account two or more characteristics (e.g., two or more higher weighted, prioritized, or ranked characteristics), over other characteristics of the group of characteristics, in prioritizing and selecting a signal and associated cell of a group of signals and associated cells for use during a communication session (e.g., when doing so is specified by, or is otherwise in accordance with, the defined communication management criteria (and corresponding communication management algorithm)). For example, based at least in part on a given context associated with a communication session associated with the UE 104 and/or user 126, the UEM 128 (or CM 130 or RM) can give (e.g., assign) a higher weight or prioritization to a first characteristic (e.g., cost, such as lower or lowest cost) and a second characteristic (e.g., a communication condition associated with the communication session) over other characteristics of the group of characteristics. The communication condition can be or can relate to bandwidth, communication rate, signal strength, reference signal received power (RSRP), reference signal received quality (RSRQ), signal-to-interference-plus-noise ratio (SINR), QoS, channel quality indicator (CQI), or other type of communication condition metric. Based at least in part on the context and the weighting or prioritization of characteristics, from a group of cells (e.g., cell 120, cell 122, cell 124, a fourth cell, a fifth cell, and a sixth cell), the UEM 128 (or CM 130 or RM) can determine a subgroup of candidate cells (e.g., cell 120, cell 122, cell 124) that each can satisfy (e.g., meet or exceed; at or greater than; or otherwise satisfy) a defined threshold (e.g., threshold minimum) communication condition value (e.g., threshold bandwidth, threshold communication rate, threshold signal strength, threshold RSRP, threshold RSRQ, threshold SINR, threshold QoS, threshold CQI, or other threshold communication condition metric value) associated with the second characteristic. From the subgroup of candidate cells, and based at least in part on the context, the UEM 128 (or CM 130 or RM) can determine, prioritize, and/or select the cell (and associated signal) of the subgroup of candidate cells (e.g., cell 120, cell 122, cell 124) that satisfies (e.g., best satisfies) the first characteristic (e.g., can determine the cell of the subgroup of candidate cells that can have the lowest cost, as compared to other candidate cells of the subgroup, if used for the communication session). The UEM 128 (or CM 130 or RM) can connect, or initiate or facilitate connection, of the UE 104 to the determined or selected cell for the communication session.

In accordance with various embodiments, the CM 130 can comprise or be associated with (e.g., communicatively connected to) AI component 208, the UEM 128 can comprise or be associated with AI component 308, and/or the RM 136 (and/or the other RMs) can comprise or be associated with AI component 406 that can perform an AI-based and/or machine learning (ML)-based analysis on data comprising or relating to communication devices (e.g., UE 104, CD 106, or other communication devices), users (e.g., user 126), user preferences associated with communication devices and users, usage behavior associated with communication devices and/or users, communication sessions, communication network conditions (e.g., signal strength, bandwidth, QoS, network congestion, network resource availability, or other communication network conditions) associated with the communication network 102, including BSs (e.g., 108, 110, 112, 114, 116) and cells (e.g., 120, 122, 124), applications (e.g., 116, 120, or 126), services (e.g., 118, 122, or 128), communication device location data, cell location data, metadata, historical information relating thereto, or other types of information.

As disclosed, in accordance with various embodiments, in connection with or as part of such an AI-based or ML-based analysis, the AI component(s) (e.g., 208, 308, and/or 406) can employ, build (e.g., construct or create), and/or import, AI and/or ML techniques and algorithms, AI and/or ML models, neural networks (e.g., trained neural networks), and/or graph mining to render and/or generate predictions, inferences, calculations, prognostications, estimates, derivations, forecasts, detections, and/or computations that can facilitate determining a context associated with a communication session associated with a communication device and/or user, determining a usage behavior associated with a communication session associated with a communication device and/or user, determining respective weights or prioritizations to apply to respective characteristics (e.g., associated with respective contexts), determining movement or potential movement of communication devices within and between RAN coverage areas associated with cells, determining available or anticipated available capacity and resources of cells, determining a type of application or service being utilized for a communication session, determining a type of data being communicated or to be communicated during a communication session, determining anticipated data usage or consumption associated with a communication session, determining a latency that can be associated with a communication session or a server associated therewith, determining respective communication conditions or anticipated communication conditions associated with respective cells with respect to a communication device for a communication session, determining respective loads or anticipated loads associated with respective cells, determining differences in coverage areas associated with cells due to environmental conditions, making other desired determinations, including the determinations described herein, and/or automating one or more functions or features of the disclosed subject matter (e.g., automating one or more functions or features of or associated with the UEM 128, the CM 130, the RM 136, a communication device, or other device or component), as more fully described herein.

The AI component(s) (e.g., 208, 308, and/or 406) can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component(s) (e.g., 208, 308, and/or 406) can examine the entirety or a subset of the data (e.g., data associated with data sessions, communication devices, or users; or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

In accordance with various embodiments, the CM 130 can comprise or be associated with (e.g., communicatively connected to) processor component 210, the UEM 128 can comprise or be associated with processor component 310, and/or the RM 136 (and/or the other RMs) can comprise or be associated with processor component 408 that respectively can work in conjunction with the other components of the CM 130, UEM 128, and/or RM 136 to facilitate performing the various functions of the CM 130, UEM 128, and/or RM 136. The processor component(s) (e.g., 210, 310, and/or 408) can employ one or more processors, microprocessors, or controllers that can process data, such as information relating to communication devices, users, user preferences, communication sessions, cells, base stations, contexts associated with communication sessions, communication devices, and/or users, characteristics associated with communication sessions, weights or prioritizations to apply to characteristics, signal and cell prioritization and connection determinations, communication conditions associated with signals, cells, and/or communication devices, environmental conditions associated with coverage areas, communication network resources, applications, services, metadata, parameters, traffic flows, policies, defined communication management criteria, algorithms (e.g., communication management algorithms, AI or machine learning algorithms, or other algorithms, as disclosed, defined, recited, or indicated herein by the methods, systems, and techniques described herein), protocols, interfaces, tools, and/or other information, to facilitate operation of the CM 130, UEM 128, and/or RM 136, as more fully disclosed herein, and control data flow between the CM 130, UEM 128, and/or RM 136 and other components (e.g., a communication device, a base station or other network component or device of the communication network, data sources, applications, or other type of component or device) associated with the CM 130, UEM 128, and/or RM 136.

In accordance with various embodiments, the CM 130 can comprise or be associated with (e.g., communicatively connected to) data store 212, the UEM 128 can comprise or be associated with data store 312, and/or the RM 136 (and/or the other RMs) can comprise or be associated with data store 410 that can store data structures (e.g., user data, metadata), code structure(s) (e.g., modules, objects, hashes, classes, procedures) or instructions, information relating to communication devices, users, user preferences, communication sessions, cells, base stations, contexts associated with communication sessions, communication devices, and/or users, characteristics associated with communication sessions, weights or prioritizations to apply to characteristics, signal and cell prioritization and connection determinations, communication conditions associated with signals, cells, and/or communication devices, environmental conditions associated with coverage areas, communication network resources, applications, services, metadata, parameters, traffic flows, policies, defined communication management criteria, algorithms (e.g., communication management algorithms, AI or machine learning algorithms, or other algorithms, as disclosed, defined, recited, or indicated herein by the methods, systems, and techniques described herein), protocols, interfaces, tools, and/or other information, to facilitate controlling operations associated with the CM 130, UEM 128, and/or RM 136. In an aspect, processor component(s) (e.g., 210, 310, and/or 408) can be functionally coupled (e.g., through a memory bus) to the data store(s) (e.g., 212, 312, and/or 410) in order to store and retrieve information desired to operate and/or confer functionality, at least in part, to the respective components of the CM 130, UEM 128, and/or RM 136, and/or substantially any other operational aspects of the CM 130, UEM 128, and/or RM 136.

It is to be appreciated and understood that, in certain embodiments, the CM 130 or an RM (e.g., RM 136) can comprise some or all of the functionality of the UEM 128, and can perform some or all of the functions and operations of the UEM 128, such as described herein. For instance, the UE 104 (e.g., UEM 128 of the UE 104) can communicate information relating to phone calls, text messages, chats, camera, electronic calendar, email, electronic gaming, communication sessions, or other applications or activity associated with the UE 104 and associated user 126 to the CM 130 (or RM). In connection with a communication session associated with the UE 104, he CM 130 (or RM) can analyze such information and other information (e.g., characteristics information, network-related information), can determine a context associated with a communication session associated with the UE 104, can respectively weight or prioritize the characteristics of the group of characteristics, and, based at least in part on the weighting or prioritization of characteristics (e.g., based on the higher or highest weighted characteristic(s)) and the context, can determine, prioritize, and/or select a cell (and associated signal), of the group of cells, that can be used by the UE 104 for the communication session, such as more fully described herein.

The disclosed techniques for the management of prioritization and selection of signals and associated cells (e.g., 120, 122, or 124) can desirably provide for enhanced (e.g., improved, more efficient, or optimal) utilization of resources associated with cells of the communication network 102, enhanced user experience of users (e.g., user 126) of communication devices (e.g., UE 104, CD 106), and enhanced cost efficiency (e.g., reduction of costs) to users and service providers, among other benefits, as compared to existing techniques for selection of cells for utilization by communication devices.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Described herein are systems, methods, articles of manufacture, and other embodiments or implementations that can facilitate detecting and mitigating aggressive and/or malicious communication devices, and associated aggressive and/or malicious events, against a RAN of a communication network, and managing attachment, registration, or connection of communication devices to the RAN or communication network, as more fully described herein. The detecting and mitigating of aggressive and/or malicious communication devices, and associated aggressive and/or malicious events against a RAN and/or communication network, managing of attachment, registration, or connection of communication devices to the RAN or communication network, and/or other features of the disclosed subject matter, can be implemented in connection with any type of device with a connection to, or attempting to connect to, the communication network (e.g., a wireless or mobile device, a computer, a handheld device, or other device), any Internet of things (IoT) device (e.g., health monitoring device, toaster, coffee maker, blinds, music players, speakers, or other IoT device), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, or other type of device. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) or other type of radio network node.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 5:
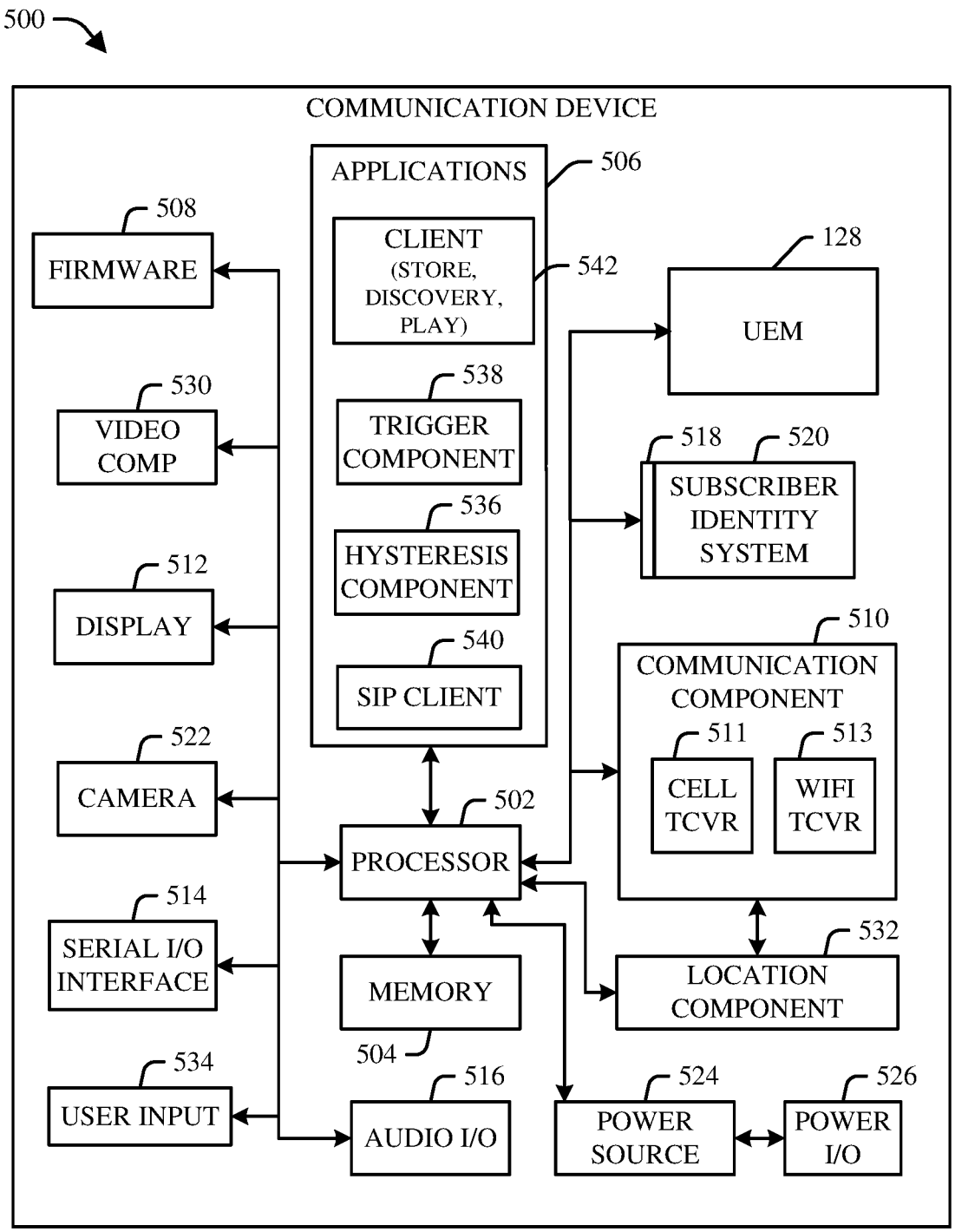
FIG. 5 depicts a block diagram of example communication device, in accordance with various aspects and embodiments of the disclosed subject matter.

Referring now to FIG. 5, depicted is an example block diagram of an example communication device 500 (e.g., UE, wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 500 can include a processor 502 for controlling and processing all onboard operations and functions. A memory 504 interfaces to the processor 502 for storage of data and one or more applications 506 (e.g., a video player software, user feedback component software, or other type of application). Other applications can include voice recognition of predetermined voice commands that facilitate initiation of the user feedback signals. The applications 506 can be stored in the memory 504 and/or in a firmware 508, and executed by the processor 502 from either or both the memory 504 or/and the firmware 508. The firmware 508 can also store startup code for execution in initializing the communication device 500. A communication component 510 interfaces to the processor 502 to facilitate wired/wireless communication with external systems, e.g., cellular networks, VoIP networks, and so on. Here, the communication component 510 can also include a suitable cellular transceiver 511 (e.g., a GSM transceiver) and/or an unlicensed transceiver 513 (e.g., Wi-Fi, WiMax) for corresponding signal communications. The communication device 500 can be a device such as a cellular telephone, a PDA with mobile communications capabilities, and messaging-centric devices. The communication component 510 also facilitates communications reception from terrestrial radio networks (e.g., broadcast), digital satellite radio networks, and Internet-based radio services networks.

The communication device 500 includes a display 512 for displaying text, images, video, telephony functions (e.g., a Caller ID function), setup functions, and for user input. For example, the display 512 can also be referred to as a "screen" that can accommodate the presentation of multimedia content (e.g., music metadata, messages, wallpaper, graphics, or other content). The display 512 can also display videos and can facilitate the generation, editing and sharing of video quotes. A serial I/O interface 514 is provided in communication with the processor 502 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 500, for example. Audio capabilities are provided with an audio I/O component 516, which can include a speaker for the output of audio signals related to, for example, indication that the user pressed the proper key or key combination to initiate the user feedback signal. The audio I/O component 516 also facilitates the input of audio signals through a microphone to record data and/or telephony voice data, and for inputting voice signals for telephone conversations.

The communication device 500 can include a slot interface 518 for accommodating a SIC (Subscriber Identity Component) in the form factor of a card Subscriber Identity Module (SIM) or universal SIM 520, and interfacing the SIM card 520 with the processor 502. However, it is to be appreciated that the SIM card 520 can be manufactured into the communication device 500, and updated by downloading data and software.

The communication device 500 can process IP data traffic through the communication component 510 to accommodate IP traffic from an IP network such as, for example, the Internet, a corporate intranet, a home network, a person area network, or other network, through an ISP or broadband cable provider. Thus, VoIP traffic can be utilized by the communication device 500 and IP-based multimedia content can be received in either an encoded or a decoded format.

A video processing component 522 (e.g., a camera) can be provided for decoding encoded multimedia content. The video processing component 522 can aid in facilitating the generation, editing, and sharing of video quotes. The communication device 500 also includes a power source 524 in the form of batteries and/or an AC power subsystem, which power source 524 can interface to an external power system or charging equipment (not shown) by a power I/O component 526.

The communication device 500 can also include a video component 530 for processing video content received and, for recording and transmitting video content. For example, the video component 530 can facilitate the generation, editing and sharing of video quotes. A location tracking component 532 facilitates geographically locating the communication device 500. As described hereinabove, this can occur when the user initiates the feedback signal automatically or manually. A user input component 534 facilitates the user initiating the quality feedback signal. The user input component 534 can also facilitate the generation, editing and sharing of video quotes. The user input component 534 can include such conventional input device technologies such as a keypad, keyboard, mouse, stylus pen, and/or touch screen, for example.

Referring again to the applications 506, a hysteresis component 536 facilitates the analysis and processing of hysteresis data, which is utilized to determine when to associate with the access point. A software trigger component 538 can be provided that facilitates triggering of the hysteresis component 536 when the Wi-Fi transceiver 513 detects the beacon of the access point. A SIP client 540 enables the communication device 500 to support SIP protocols and register the subscriber with the SIP registrar server. The applications 506 can also include a client 542 that provides at least the capability of discovery, play and store of multimedia content, for example, music.

The communication device 500, as indicated above related to the communication component 510, can include an indoor network radio transceiver 513 (e.g., Wi-Fi transceiver). This function supports the indoor radio link, such as IEEE 802.11, for the dual-mode GSM device (e.g., communication device 500). The communication device 500 can accommodate at least satellite radio services through a device (e.g., handset device) that can combine wireless voice and digital radio chipsets into a single device (e.g., single handheld device).

In some embodiments, the communication device 500 can comprise the UEM 128 that can manage (e.g., control) prioritization and selection of a signal (e.g., RAN signal) and associated cell over other signals and associated cells, in accordance with a profile and/or the defined communication management criteria, such as more fully described herein.

Figure 6:
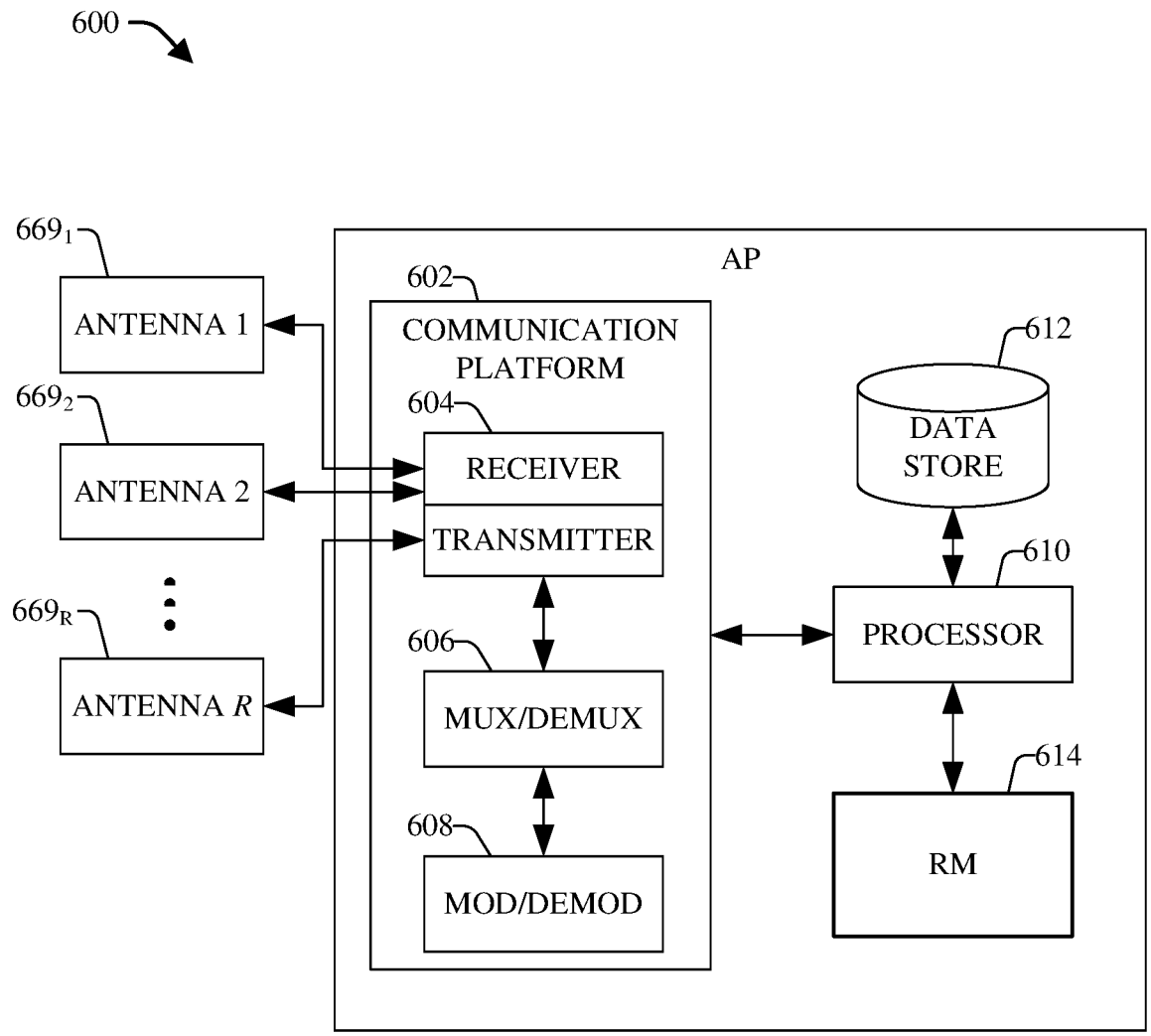
FIG. 6 illustrates a block diagram of an example access point, in accordance with various aspects and embodiments of the disclosed subject matter.

FIG. 6 illustrates a block diagram of an example access point (AP) 600 (e.g., macro base station, femto AP, pico AP, CBRS AP, Wi-Fi AP, Wi-Fi-direct AP, or other type of AP), in accordance with various aspects and embodiments of the disclosed subject matter. The AP 600 can receive and transmit signal(s) from and to wireless devices like access points (e.g., base stations, femtocells, picocells, or other type of AP), access terminals (e.g., UEs), wireless ports and routers, and the like, through a set of antennas $669_1$-$669_R$. In an aspect, the antennas $669_1$-$669_R$ are a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-array quadrature amplitude modulation (QAM), with M a positive integer), phase-shift keying (PSK), and the like.

The AP 600 also can comprise a processor(s) 610 that can be configured to confer and/or facilitate providing functionality, at least partially, to substantially any electronic component in or associated with the AP 600. For instance, the processor(s) 610 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 600 can include a data store 612 that can store data structures; code instructions; rate coding information; information relating to measurement of radio link quality or reception of information related thereto; information relating to communication conditions (e.g., signal-to-interference-plus-noise ratio (SINR), reference signal received power (RSRP), reference signal received quality (RSRQ), channel quality indicator (CQI), and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold QoS values, or other type of threshold value), metadata, parameters, traffic flows, policies, rules, signaling, defined network security criteria, network security algorithms, protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 610 can be coupled to the data store 612 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined QoS values, or other type of threshold value), metadata, parameters, traffic flows, policies, rules, signaling, defined network security criteria, network security algorithms, protocols, interfaces, tools, and/or other information that can be desired to operate and/or confer functionality to the communication platform 602 and/or other operational components of AP 600.

In some embodiments, the AP 600 can comprise an RM 614 that can be architecture aware with regard to the architecture or topology of the communication network, can manage and/or adjust signal strength values associated with signals of the AP 600 to UEs to facilitate steering UEs towards connecting, or away from connecting, to the AP 600, can perform or facilitate performing load balancing, can augment profiles associated with UEs or provide information to the CM or UEMs to facilitate creating or augmenting profiles, and/or can perform other functions, in accordance with the defined communication management criteria, such as more fully described herein. The RM 614 can be the same as or similar to, and/or can comprise the same or similar functionality as, the RM 136 or other RMs, such as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
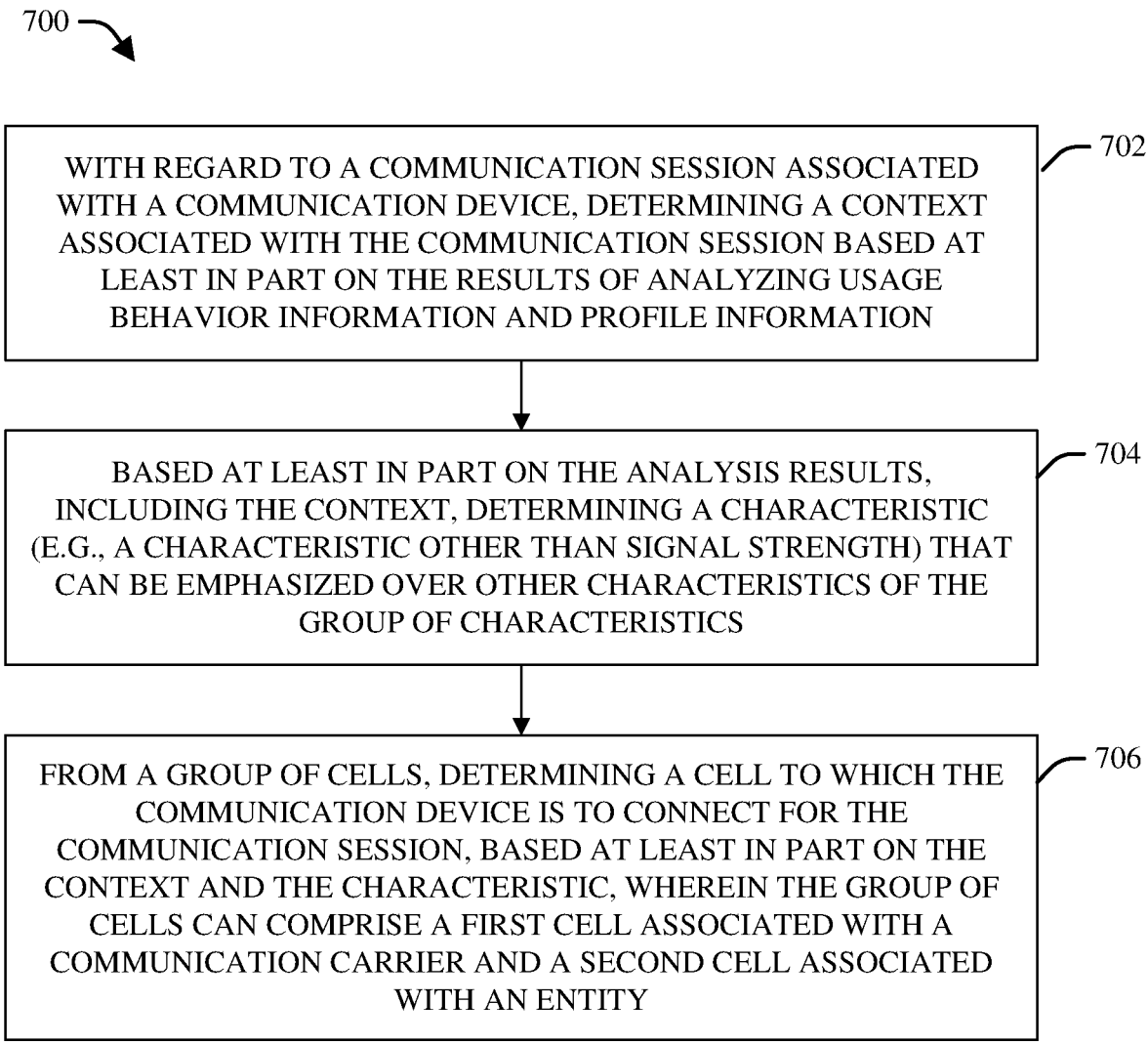
FIG. 7 illustrates a flow chart of an example method that can manage prioritization and selection of signals and associated cells of a communication network, in accordance with various aspects and embodiments of the disclosed subject matter.
Figure 8:
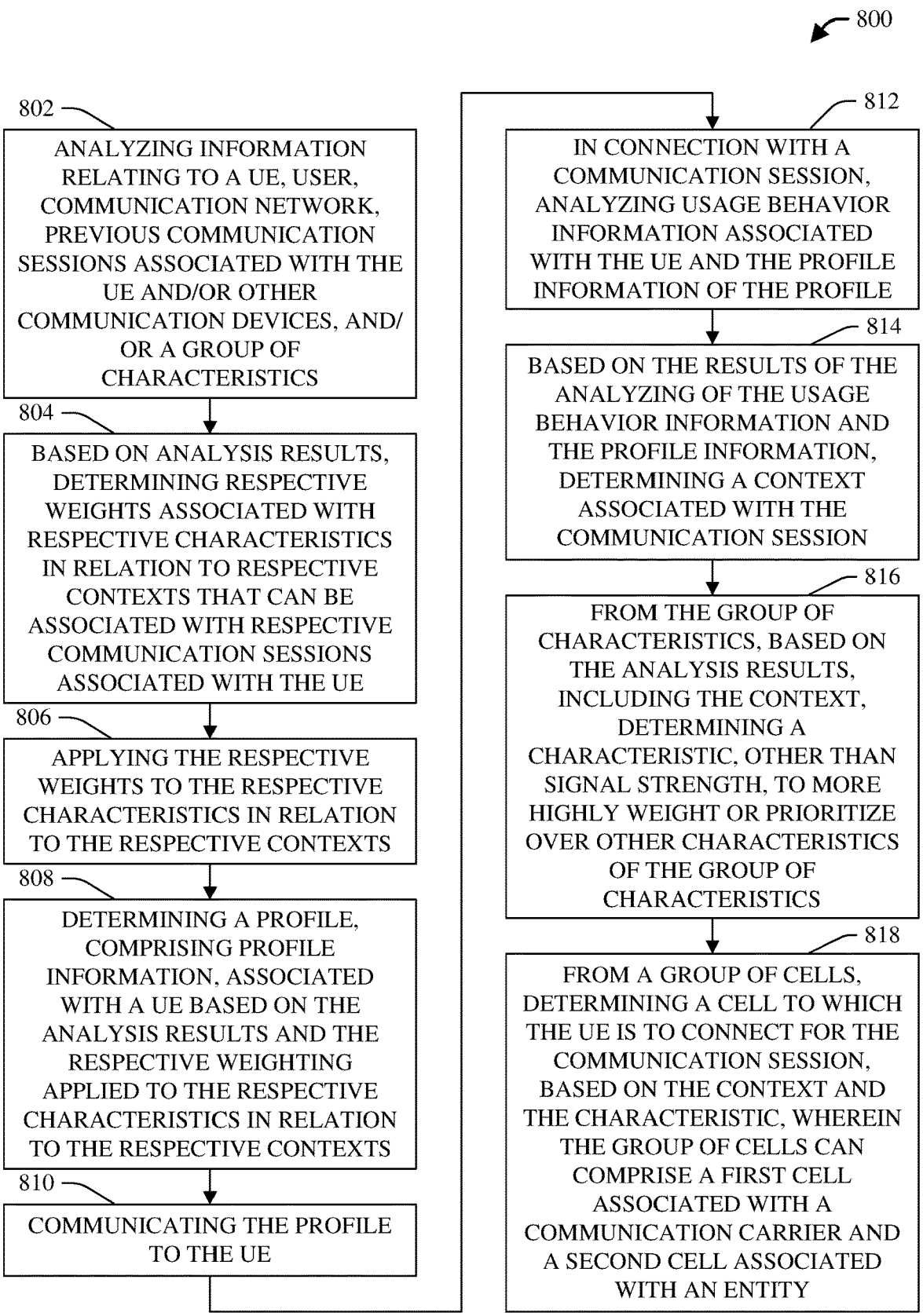
FIG. 8 depicts a flow chart of another example method that can manage prioritization and selection of signals and associated cells of a communication network, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can manage prioritization and selection of signals and associated cells of a communication network, in accordance with various aspects and embodiments of the disclosed subject matter. The method 700 can be employed by, for example, a system comprising the UEM, CM, RM, a processor component (e.g., of or associated with the UEM, CM, or RM), and/or a data store (e.g., of or associated with the UEM, CM, or RM).

At 702, with regard to a communication session associated with a communication device, a context associated with the communication session can be determined based at least in part on the results of analyzing usage behavior information and profile information. The UEM can analyze the usage behavior information and the profile information. The usage behavior information can relate to a usage behavior associated with the communication device (e.g., UE). The profile information can relate to a profile associated with the communication device, wherein the profile can relate to a group of characteristics associated with communication sessions, comprising the communication session, and can relate to at least a portion of respective cells of a group of cells. The UEM can determine the context associated with the communication session based at least in part on the results of analyzing the usage behavior information and the profile information.

At 704, based at least in part on the analysis results, including the context, a characteristic (e.g., a characteristic other than signal strength), which can be emphasized over other characteristics of the group of characteristics, can be determined. Based at least in part on the analysis results, including the context, the UEM can determine the characteristic that can be emphasized over other characteristics of the group of characteristics. For instance, the UEM can determine the characteristic that can be more heavily weighted or prioritized over the other characteristics with respect to determining which cell, of the group of cells, that the communication device is to connect to for the communication session, in accordance with the defined communication management criteria. In some embodiments, the profile and/or a user preference of the user can indicate the respective weight or prioritization values that are to be associated with the respective characteristics based at least in part on (e.g., under) respective contexts, and the UEM can associate or apply such respective weight or prioritization values with or to the respective characteristics. The group of characteristics associated with communication sessions can comprise various characteristics (e.g., cost associated use of a cell, potential mobility of the communication device, potential duration of the communication session, or other type of characteristic), such as more fully described herein.

At 706, from a group of cells, a cell to which the communication device is to connect for the communication session can be determined, based at least in part on the context and the characteristic, wherein the group of cells can comprise a first cell associated with a communication carrier and a second cell associated with an entity. The UEM can determine the cell of the group of cells (e.g., first cell, second cell, or other cell) to which the communication device is to connect for the communication session, based at least in part on the context and the characteristic (e.g., the highest weighted or prioritized characteristic), in accordance with the defined communication management criteria. The UEM can select the cell determined from the group of cells, and can connect or facilitate connecting the communication device to the cell for the communication session.

FIG. 8 depicts a flow chart of another example method 800 that can manage prioritization and selection of signals and associated cells of a communication network, in accordance with various aspects and embodiments of the disclosed subject matter. The method 800 can be employed by, for example, a system comprising the UEM, CM, RM, a processor component (e.g., of or associated with the UEM, CM, or RM), and/or a data store (e.g., of or associated with the UEM, CM, or RM).

At 802, information relating to a UE and/or associated user, a communication network, previous communication sessions associated with the UE and/or other communication devices, and/or a group of characteristics can be analyzed. The CM can analyze the information relating to the UE and/or associated user (and/or user preferences associated with the UE and/or user), the communication network, the previous communication sessions associated with the UE and/or other communication devices, and/or the group of characteristics. The group of characteristics can comprise various characteristics (e.g., cost associated with a communication session, potential UE mobility, potential call duration, and/or other characteristics) associated with the UE, user, cells, and/or the communication network, such as described herein.

At 804, based at least in part on the results of the analysis, respective weights associated with respective characteristics in relation to respective contexts that can be associated with respective communication sessions associated with the UE can be determined. At 806, the respective weights can be applied to the respective characteristics in relation to the respective contexts. The CM can determine the respective (e.g., different) weights associated with the respective characteristics in relation to the respective contexts that can be associated with the respective communication sessions associated with the UE, based at least in part on the analysis results, in accordance with the defined communication management criteria and/or user preferences associated with the UE and/or user. The CM can apply or associate the respective weights to or with the respective characteristics in relation to the respective contexts.

At 808, a profile, comprising profile information, associated with a UE can be determined based at least in part on the analysis results and the respective weighting applied to the respective characteristics in relation to the respective contexts. In some embodiments, can determine and generate the profile, comprising the profile information, that can relate to one or more characteristics of a group of characteristics that can be relevant in determining which cell of a group of cells of the communication network that the UE is to connect to for a communication session. In certain embodiments, the profile associated with the UE and/or user can comprise respective sub-profiles associated with respective contexts that can be associated with communication sessions, the UE, and/or the user, wherein different sub-profiles can differently weight or prioritize different characteristics depending in part on the different contexts. The CM can determine and generate respective (e.g., different) profile for respective UEs.

At 810, the profile, comprising the profile information, can be communicated to the UE. The CM can communicate the profile to the UE. The UEM of the UE can receive the profile. In some embodiments, the profile can be communicated to the UE via a base station, wherein the RM of the base station, after receiving the profile from the CM, can augment or update the profile with other profile information that can relate to one or more of the characteristics, such as described herein. The augmented or updated profile can be communicated by the base station to the UE.

At 812, in connection with a communication session associated with the UE, usage behavior information associated with the UE and the profile information of the profile can be analyzed. The UEM can analyze the usage behavior information and the profile information, in connection with the communication session (e.g., communication session that the UE is about to engage in or in which the UE is participating). The usage behavior information can be associated with the UE and/or the user. The usage behavior information can indicate or relate to usage behavior of the user when using the UE and/or other relevant behavior of the user, such as described herein. For instance, the usage behavior information can indicate or relate to circumstances of the use of the UE by the user, who the user has called or texted with, how long the user talks to certain people on the phone, whether the user is moving when engaged in a phone call or other communication, respective locations where the UE is located when engaged in respective communication sessions, respective times of respective communication sessions, electronic calendar or schedule information relating to upcoming or prior events (e.g., events that can involve use of the communication device, or events that can indicate the user will not be using the UE), social media applications utilized by the user and how the user utilizes such applications (e.g. how long the user utilizes a social media application, when the user utilizes the social media application), and/or other usage behavior, such as described herein. In some embodiments, the usage behavior information and/or the profile information can comprise information that can relate to the communication session. In certain embodiments, the usage behavior information also can indicate or comprise user preferences of the user with regard to usage of the UE and/or how to weight or prioritize characteristics of the group of characteristics.

At 814, based at least in part on the results of the analyzing of the usage behavior information and the profile information, a context associated with the communication session can be determined. For instance, the UEM can determine the context associated with the communication session based at least in part on the results of the analyzing of the usage behavior information and the profile information, such as described herein.

At 816, from the group of characteristics, based at least in part on the analysis results, including the context, a characteristic, other than signal strength, to more highly weight or prioritize over other characteristics of the group of characteristics can be determined. Based at least in part on the analysis results, including the context, the UEM can determine a characteristic, other than signal strength, to more highly weight or prioritize (e.g., more highly rank or emphasize) over the other characteristics of the group of characteristics, such as described herein.

At 818, from a group of cells, a cell to which the UE is to connect for the communication session can be determined, based at least in part on the context and the characteristic, wherein the group of cells can comprise a first cell associated with a communication carrier and a second cell associated with an entity. The UEM can determine the cell of the group of cells (e.g., first cell, second cell, or other cell) to which the UE is to connect for the communication session, based at least in part on the context and the characteristic (e.g., the highest weighted or prioritized characteristic), in accordance with the defined communication management criteria. The UEM can select the cell determined from the group of cells, and can connect or facilitate connecting the UE to the cell for the communication session.

Figure 9:
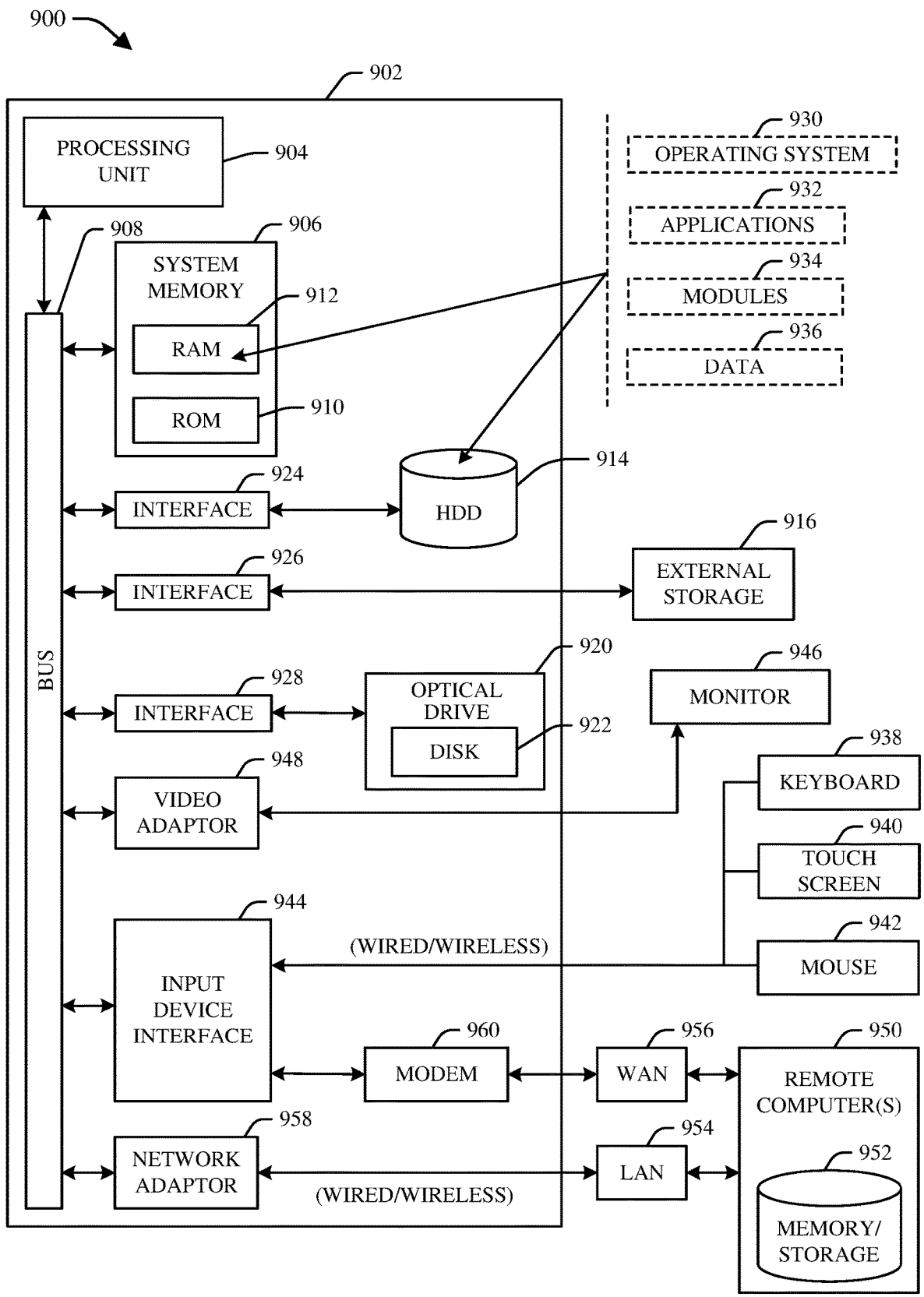
FIG. 9 is a schematic block diagram illustrating a suitable computing environment in which the various embodiments of the embodiments described herein can be implemented.

In order to provide additional context for various embodiments described herein, FIG. 9 and the following discussion are intended to provide a brief, general description of a suitable computing environment 900 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, or other type of storage device) and an optical disk drive 920 (e.g., which can read or write from a CD-ROM disc, a DVD, a BD, or other disk drive). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH™ interface, or other type of interface.

A monitor 946 or other type of display device can be also connected to the system bus 908 via an interface, such as a video adapter 948. In addition to the monitor 946, a computer typically includes other peripheral output devices (not shown), such as speakers, printers, or other type of peripheral output device.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956, e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other equipment or entity), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other alphanumeric character) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well non-mobile networks (e.g., the internet, data service network such as internet protocol television (IPTV), or other network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or non-volatile memory (e.g., flash memory devices, such as, for example, card, stick, key drive, or other type of memory device), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, UE, base station, cell, communication network, UEM, CM, RM, application, service, AI component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and

What is claimed is:

1. A method, comprising:
in connection with a communication session associated with a user equipment, determining, by a system comprising a processor, a context associated with the communication session and a characteristic, other than signal strength, associated with the communication session based on analyzing usage behavior data and profile data, wherein the usage behavior data relates to a usage behavior associated with the user equipment, wherein the profile data relates to a profile associated with the user equipment, and wherein the profile relates to a group of characteristics, comprising the characteristic, associated with communication sessions, comprising the communication session, and relates to at least a portion of respective cell devices of a group of cell devices; and
from the group of cell devices, determining, by the system, a cell device to which the user equipment is to connect for the communication session, based on the context and the characteristic, wherein the group of cell devices comprises a first cell device associated with a communication carrier identity and a second cell device associated with an entity identity.

2. The method of claim 1, wherein the group of cell devices comprises the first cell device, the second cell device, or a third cell device, wherein the communication carrier identity is a first communication carrier identity or a first roaming communication carrier identity, wherein the user equipment is associated with a subscription for a communication service associated with the first communication carrier identity, wherein the entity identity is a first entity identity or a second roaming communication carrier identity, and wherein the third cell device is associated with a second entity identity.

3. The method of claim 2, wherein the first cell device is a first macro cell device, wherein the second cell device is a second macro cell device, a first micro cell device, a first citizens broadband radio service cell device, a first femto cell device, a first pico cell device, or a first wireless fidelity cell device, and wherein the third cell device is a second micro cell device, a second citizens broadband radio service cell device, a second femto cell device, a second pico cell device, or a second wireless fidelity cell device.

4. The method of claim 1, wherein respective characteristics of the group of characteristics respectively relate to respective costs associated with utilizing the respective cell devices, a predicted movement of the user equipment during the communication session, respective effects on the respective signal strengths associated with the respective environmental conditions relating to respective locations or respective predicted locations of the user equipment during the communication session, a predicted duration of the communication session, respective predicted availabilities of capacities or resources associated with the respective cell devices, a predicted amount of data to be communicated during the communication session, respective latencies associated with respective servers associated with respective services, a prioritization of data traffic to be communicated during the communication session, respective signal strengths associated with the respective cell devices and the user equipment, respective predicted loads associated with the respective cell devices, or respective predicted movements of respective user equipments into respective coverages areas associated with the respective cell devices.

5. The method of claim 1, wherein the determining of the context comprises:
analyzing, by the system, communication session data associated with the communication session and previous communication sessions associated with the user equipment, calendar or schedule data associated with an electronic calendar or the user equipment, time data regarding a time associated with the communication session, or location data associated with a location associated with the user equipment in connection with the communication session and historical locations associated with the user equipment in connection with the previous communication sessions; and
determining the context associated with the communication session based on a result of the analyzing of the communication session data, the calendar or schedule data, the time data, or the location data, wherein the usage behavior data comprises at least a portion of the communication session data, the calendar or schedule data, the time data, or the location data.

6. The method of claim 1, further comprising:
based on the context, determining, by the system, respective weight values to apply to respective characteristics of the group of characteristics; and
applying, by the system, the respective weight values to the respective characteristics, wherein the determining of the characteristic comprises determining the characteristic, of the respective characteristics, that has a highest weight value as compared to other weight values of other characteristics of the respective characteristics.

7. The method of claim 6, wherein the determining of the respective weight values comprises determining, based on the context, a first weight value is to be applied to a first characteristic and a second weight value is to be applied to a second characteristic for the communication session, wherein the second weight value is higher than the first weight value, wherein the characteristic is the first characteristic, and
wherein the applying comprises, for the communication session, applying the first weight value to the first characteristic and the second weight value to the second characteristic.

8. The method of claim 6, wherein the context is a first context, wherein the communication session is a first communication session, wherein the usage behavior data relating to the usage behavior is first usage behavior data relating to a first usage behavior, wherein the profile data relating to the profile is first profile data relating to a first profile, and wherein the method further comprises:
in connection with a second communication session associated with the user equipment, determining, by the system, a second context associated with the second communication session based on analyzing second usage behavior data and second profile data, wherein the second usage behavior data relates to a second usage behavior associated with the user equipment, wherein the second profile data relates to a second profile associated with the user equipment;
based on the second context, determining, by the system, a third weight value is to be applied to the first characteristic and a fourth weight value is to be applied to the second characteristic for the second communication session, wherein the third weight value is higher than the fourth weight value; and for the second communication session, applying, by the system, the third weight value to the first characteristic and the fourth weight value to the second characteristic.

9. The method of claim 6, wherein the respective characteristics comprise a first characteristic relating to respective signal strengths associated with the respective cell devices and the user equipment, and a second characteristic relating to respective costs associated with utilizing the respective cell devices, wherein the respective weight values comprise a first weight value associated with the first characteristic and a second weight value associated with the second characteristic, wherein the second weight value is higher than the first weight value,
 wherein the context indicates that a first signal strength associated with the first cell device is higher than a second signal strength associated with the second cell device, indicates that the second signal strength satisfies a defined minimum signal strength, and indicates that a first cost associated with utilization of the first cell device is higher than a second cost associated with utilization of the second cell device, and
 wherein the determining of the cell device to which the user equipment is to connect for the communication session comprises determining that the user equipment is to connect to the second cell device for the communication session based on the second characteristic being associated with the second weight value that is higher than the first weight value associated with the first characteristic, and based on the context indicating that the second cost associated with the second cell device is lower than the first cost associated with the first cell device, even though the first signal strength is higher than the second signal strength.

10. The method of claim 6, wherein the respective characteristics comprise a first characteristic relating to a prioritization of data traffic to be communicated during the communication session, and a second characteristic relating to respective costs associated with utilizing the respective cell devices, wherein the respective weight values comprise a first weight value associated with the first characteristic and a second weight value associated with the second characteristic, wherein the first weight value is higher than the second weight value,
 wherein the context indicates that the data traffic associated with the communication session has a defined high priority level associated with an emergency response service, indicates that the first cell device is able to provide a higher quality of service than the second cell device for the communication session, and indicates that a first cost associated with utilization of the first cell device is higher than a second cost associated with utilization of the second cell device, and
 wherein the determining of the cell device to which the user equipment is to connect for the communication session comprises determining that the user equipment is to connect to the first cell device for the communication session based on the first characteristic being associated with the first weight value that is higher than the second weight value associated with the second characteristic, and based on the context indicating that the data traffic associated with the communication session has the defined high priority level associated with the emergency response service and indicating that the first cell device being able to provide the higher quality of service than the second cell device for the communication session, even though the first cost is higher than the second cost.

11. The method of claim 6, wherein the respective characteristics comprise a first characteristic relating to respective signal strengths associated with the respective cell devices and the user equipment, and a second characteristic relating to a predicted movement of the user equipment during the communication session, wherein the respective weight values comprise a first weight value associated with the first characteristic and a second weight value associated with the second characteristic, wherein the second weight value is higher than the first weight value,
 wherein the context indicates that a second signal strength associated with the second cell device is higher than a first signal strength associated with the first cell device, indicates that the first signal strength satisfies a defined minimum signal strength, and indicates that the user equipment is predicted to move away from the second cell device and towards the first cell device during the communication session, and
 wherein the determining of the cell device to which the user equipment is to connect for the communication session comprises determining that the user equipment is to connect to the first cell device for the communication session based on the second characteristic being associated with the second weight value that is higher than the first weight value associated with the first characteristic, and based on the context indicating that the user equipment is predicted to move away from the second cell device and towards the first cell device during the communication session, even though the second signal strength is higher than the first signal strength.

12. The method of claim 6, wherein the respective characteristics comprise a first characteristic relating to respective predicted availabilities of capacities or resources associated with the respective cell devices, and a second characteristic relating to respective signal strengths associated with the respective cell devices and the user equipment, wherein the respective weight values comprise a first weight value associated with the first characteristic and a second weight value associated with the second characteristic, wherein the first weight value is higher than the second weight value,
 wherein the context indicates that a second signal strength associated with the second cell device is higher than a first signal strength associated with the first cell device, indicates that the first signal strength satisfies a defined minimum signal strength, and indicates that a second availability of capacity or resources associated with the second cell device is predicted to be lower than a first availability of capacity or resources associated with the first cell device during a portion of the communication session, and
 wherein the determining of the cell device to which the user equipment is to connect for the communication session comprises determining that the user equipment is to connect to the first cell device for the communication session based on the first characteristic being associated with the first weight value that is higher than the second weight value associated with the second characteristic, and based on the context indicating that the second availability of capacity or resources associated with the second cell device is predicted to be lower than the first availability of capacity or resources associated with the first cell device during the portion of the communication session, even though the second signal strength is higher than the first signal strength.

13. A system, comprising:
- a processor; and
- a memory that stores executable instructions that, when executed by the processor, facilitate performance of operations, comprising:
  - in connection with a communication session associated with a device, determining a context associated with the communication session and an attribute, other than signal strength, associated with the communication session based on analyzing usage behavior information and profile information, wherein the usage behavior information relates to a usage behavior associated with the device, wherein the profile information relates to a profile associated with the device, and wherein the profile relates to a group of attributes, comprising the attribute, associated with communication sessions, comprising the communication session, and relates to at least a portion of respective cell devices of a group of cell devices; and
  - from the group of cell devices, determining a cell device to which the device is to connect for the communication session, based on the context and the attribute, wherein the group of cell devices comprises a first cell device associated with a communication carrier identity and a second cell device associated with an entity identity.

14. The system of claim 13, wherein the group of cell devices comprises the first cell device, the second cell device, or a third cell device, wherein the communication carrier identity is a first communication carrier identity or a first roaming communication carrier identity, wherein the device is associated with a subscription for a communication service associated with the first communication carrier identity, wherein the entity identity is a first entity identity or a second roaming communication carrier identity, and wherein the third cell device is associated with a second entity identity.

15. The system of claim 14, wherein the first cell device is a first macro cell device, wherein the second cell device is a second macro cell device, a first micro cell device, a first citizens broadband radio service cell device, a first femto cell device, a first pico cell device, or a first wireless fidelity cell device, and wherein the third cell device is a second micro cell device, a second citizens broadband radio service cell device, a second femto cell device, a second pico cell device, or a second wireless fidelity cell device.

16. The system of claim 13, wherein respective attributes of the group of attributes respectively relate to respective costs associated with utilizing the respective cell devices, a predicted movement of the device during the communication session, respective effects on the respective signal strengths associated with the respective environmental conditions relating to respective locations or respective predicted locations of the device during the communication session, a predicted time length of the communication session, respective predicted availabilities of capacities or resources associated with the respective cell devices, a predicted bandwidth associated with the communication session, a predicted amount of data to be communicated during the communication session, respective latencies associated with respective servers associated with respective services, a priority level of data traffic to be communicated during the communication session, respective signal strengths associated with the respective cell devices and the device, respective predicted loads associated with the respective cell devices, or respective predicted movements of respective devices into respective coverages areas associated with the respective cell devices.

17. The system of claim 13, wherein the operations further comprise:
- analyzing communication session information associated with the communication session and previous communication sessions associated with the device, calendar or schedule information associated with an electronic calendar or the device, time information regarding a time associated with the communication session, or location information associated with a location associated with the device in connection with the communication session and historical locations associated with the device in connection with the previous communication sessions;
- determining the context associated with the communication session based on a result of the analyzing of the communication session information, the calendar or schedule information, the time information, or the location information, wherein the usage behavior information comprises at least a portion of the communication session information, the calendar or schedule information, the time information, or the location information;
- based on the context, determining respective weight values to apply to respective attributes of the group of attributes; and
- associating the respective weight values with the respective attributes, wherein the determining of the attribute comprises determining the attribute, of the respective attributes, that is associated with a highest weight value as compared to other weight values associated with other attributes of the respective attributes.

18. A non-transitory machine-readable medium, comprising executable instructions that, when executed by a processor, facilitate performance of operations, comprising:
- with regard to a communication session associated with a device, determining a context associated with the communication session based on analyzing usage behavior information and profile information, wherein the usage behavior information relates to a usage behavior associated with the device, wherein the profile information relates to a profile associated with the device, and wherein the profile relates to a group of characteristics associated with communication sessions, comprising the communication session, and relates to at least a portion of respective cell devices of a group of cell devices;
- from the group of characteristics, based on the analyzing and the context, determining a characteristic, other than signal strength, to emphasize over other characteristics of the group of characteristics; and
- from the group of cell devices, determining a cell device to which the device is to connect for the communication session, based on the context and the characteristic, wherein the group of cell devices comprises a first cell device associated with a communication carrier identity and a second cell device associated with an entity identity.

19. The non-transitory machine-readable medium of claim 18, wherein the group of cell devices comprises the first cell device, the second cell device, or a third cell device, wherein the communication carrier identity is a first communication carrier identity or a first roaming communication carrier identity, wherein the device is associated with a subscription for a communication service associated with the first communication carrier identity, wherein the entity identity is a first entity identity or a second roaming communication carrier identity, and wherein the third cell device is associated with a second entity identity; and wherein the first cell device is a first macro cell device, wherein the second cell device is a second macro cell device, a first micro cell device, a first citizens broadband radio service cell device, a first femto cell device, a first pico cell device, or a first wireless fidelity cell device, and wherein the third cell device is a second micro cell device, a second citizens broadband radio service cell device, a second femto cell device, a second pico cell device, or a second wireless fidelity cell device.

20. The non-transitory machine-readable medium of claim 18, wherein respective characteristics of the group of characteristics respectively relate to respective costs associated with utilizing the respective cell devices, a predicted movement of the device during the communication session, respective effects on the respective signal strengths associated with the respective environmental conditions relating to respective locations or respective predicted locations of the device during the communication session, a predicted duration of the communication session, respective predicted availabilities of capacities or resources associated with the respective cell devices, a predicted amount of data to be communicated during the communication session, respective latencies associated with respective servers associated with respective services, a prioritization of data traffic to be communicated during the communication session, respective signal strengths associated with the respective cell devices and the device, respective predicted loads associated with the respective cell devices, or respective predicted movements of respective devices into respective coverages areas associated with the respective cell devices.

* * * * *